US008842891B2

(12) United States Patent
Nagesh et al.

(10) Patent No.: US 8,842,891 B2
(45) Date of Patent: Sep. 23, 2014

(54) ULTRA-LOW DIMENSIONAL REPRESENTATION FOR FACE RECOGNITION UNDER VARYING EXPRESSIONS

(75) Inventors: Pradeep Nagesh, Irvine, CA (US); Baoxin Li, Chandler, AZ (US)

(73) Assignee: Arizona Board of Regents on behalf of Arizona State University, Scottsdale, AZ (US)

(*) Notice: Subject to any disclaimer, the term of this patent is extended or adjusted under 35 U.S.C. 154(b) by 278 days.

(21) Appl. No.: 13/321,750

(22) PCT Filed: May 26, 2010

(86) PCT No.: PCT/US2010/036206
§ 371 (c)(1),
(2), (4) Date: Feb. 2, 2012

(87) PCT Pub. No.: WO2010/144259
PCT Pub. Date: Dec. 16, 2010

(65) Prior Publication Data
US 2012/0121142 A1    May 17, 2012

Related U.S. Application Data

(60) Provisional application No. 61/185,367, filed on Jun. 9, 2009.

(51) Int. Cl.
*G06K 9/00* (2006.01)
*G06K 9/62* (2006.01)

(52) U.S. Cl.
CPC .......... *G06K 9/00288* (2013.01); *G06K 9/624* (2013.01)
USPC ........... 382/118; 382/190; 382/209; 382/117; 382/115; 382/308; 382/224; 382/159; 713/186

(58) Field of Classification Search
CPC .......... G06K 9/00288; G06K 9/00221; G06K 9/00268; G06K 9/00281; G06K 9/00302; G06K 9/00677; G06K 9/00275; G06K 9/00295; G06K 9/46; G06K 9/6267; G06K 9/0021
USPC ......... 382/118, 190, 209, 117, 115, 308, 224, 382/159; 713/186
See application file for complete search history.

(56) References Cited

U.S. PATENT DOCUMENTS

| 7,095,878 B1* | 8/2006 | Taylor et al. ............. 382/118 |
| 2007/0081729 A1 | 4/2007 | Ogawa |
| 2009/0000637 A1 | 1/2009 | Takano et al. |

FOREIGN PATENT DOCUMENTS

WO    WO-2010/144259 A1    12/2010

OTHER PUBLICATIONS

Aharon et al., "K-SVD: An algorithm for designing overcomplete dictionaries for sparse representation," IEEE Transactions on Signal Processing, vol. 54, pp. 4311-4322 (2006).*

(Continued)

*Primary Examiner* — Mike Rahmjoo
(74) *Attorney, Agent, or Firm* — Ballard Spahr LLP

(57) ABSTRACT

A method, apparatus and computer program product are provided for identifying an unknown subject using face recognition. In particular, upon receiving a plurality of images depicting a subject, the method may include deriving and storing a common component image and a gross innovation component image associated with the subject, wherein the subject can later be identified in a new image using these two stored images. The common component image may capture features that are common to all of the received images depicting the subject, whereas the gross innovation component image may capture a combination of the features that are unique to each of the received images. The method may further include deriving and storing a low-rank data matrix associated with the received images, wherein the low-rank data matrix may capture any illumination differences and/or occlusions associated with the received images.

15 Claims, 16 Drawing Sheets

(56) References Cited

OTHER PUBLICATIONS

Aharon et al., "K-SVD: An Algorithm for designing overcomplete dictionaries for sparse representation," *IEEE Transactions on Signal Processing*, 54: 4311-4322 (2006).
Belhumeur P, et al., "Eigenfaces vs. Fisherfaces: recognition using class specific linear projection," in: *European Conference on Computer Vision*, 45-58 (1996).
Candés EJ, et al., "An Introduction to Compressive Sampling," *IEEE Signal Proc. Magazine*, 25(2): 21-31 (2008).
Candés EJ, et al., "Near-optimal signal recovery from random projections: Universal encoding strategies?" *IEEE Trans. on Information Theory*, 52(12): 5406-5425 (2006).
Candés EJ, et al., "Practical signal recovery from random projections," *Wavelet Applications in Signal and Image Processing*, 1(4): 586-597 (2007).
Candés EJ, et al., "Robust uncertainty principles: Exact signal reconstruction from highly incomplete frequency information," *IEEE Trans. Inf. Theory*, 52: 489-509 (2006).
Candés EJ, et al., "Stable signal recovery from incomplete and inaccurate measurements," *Comm. On Pure and Applied Math*, 59(8): 1207-1223 (2006).
Donoho DL, et al., "Compressed sensing," *IEEE Trans. Inform. Theory*, 52: 1289-1306 (2006).
Duarte MF, et al., "Distributed Compressed Sensing of jointly Sparse Signals," *39th Asilomar Conference on Signals, Systems and Computer* (IEEE Cat. No. 05CH37761), 1537-1541 (2005).
"Face Recognition: Part 2," *Biometric Technology Today*, 10-11 (2007).
Figueiredo M, et al., "Gradient projection for sparse reconstruction: application to compressed sensing and other inverse problems," *IEEE Journal on Selected Topics in Signal Processing*, 1(4): 586-597 (2007).
Huang X, et al., "Simultaneous Image Transformation and Sparse Representation Recovery," *IEEE Conf. on CVPR*, Anchorage, AK (2008).
Kanade T, et al., "Comprehensive database for facial expression analysis," *IEEE Int. Conf. on Automatic Face and Gesture Recognition*, Grenoble, France (2000).
Kim S, et al., "A method for large-scare λ1-regularized least squares problems with applications in signal processing and statistics," *IEEE J. Selected Topics in Signal Processing*, 1(4): 606-617 (2007).
Liu X, et al., "Face Authentication for Multiple Subjects Using Eigenflow," *Pattern Recognition*, 36(2): 313-328 (2003).
Lyons MJ, et al., "Coding Facial Expressions with Gabor Wavelets," *IEEE Int Conf. on Auto. Face and Gesture Recognition*, Nara, Japan (1998).
Turk M, et al., "Eigenfaces for recognition," *Journal of cognitive neuroscience*, 3: 71-86 (1991).
Wright J, et al., "Robust face recognition via sparse representation," *IEEE Trans. PAMI* [DOI 10.1109/TPAMI.2008.79].
Wright J, et al., "Robust principal component analysis: Exact recovery of corrupted low-rank matrices via convex optimization," submitted to Journal of the ACM, (2009).
Zhao W, et al., "Face Recognition: A Literature Survey," *ACM Computing Surveys*, 35(4): 399-458 (2003).
International Preliminary Report on Patentability issued Dec. 12, 2011 for Intl. App. No. PCT/US2010/036206 filed May 26, 2010 and published as WO 2010/144259 on Dec. 16, 2010 (Applicant—Arizona Board of Regents Acting for and on Behalf of Arizona State University; Inventors—Nagesh et al.); (5 pages).
International Search Report mailed on Jul. 20, 2010 for Intl. App. No. PCT/US2010/036206 filed May 26, 2010 and published as WO 2010/144259 on Dec. 16, 2010 (Applicant—Arizona Board of Regents Acting for and on Behalf of Arizona State University; Inventors—Nagesh et al.); (2 pages).
Written Opinion mailed on Jul. 20, 2010 for Intl. App. No. PCT/US2010/036206 filed May 26, 2010 and published as Wo 2010/144259 on Dec. 16, 2010 (Applicant —Arizona Board of Regents Acting for and on Behalf of Arizona State University; Inventors—Nagesh et al.; (4 pages).

\* cited by examiner

FIG. 4A
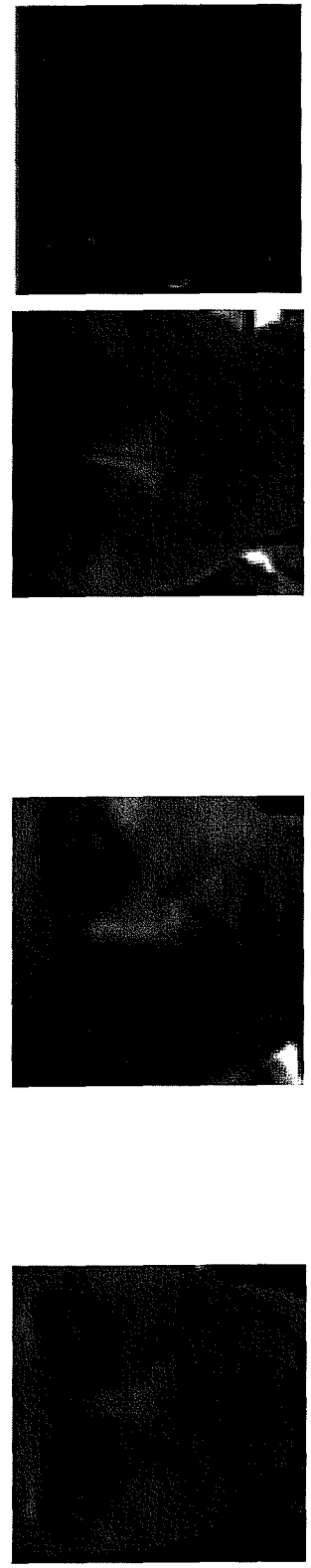
FIG. 4D
FIG. 4C
FIG. 4B

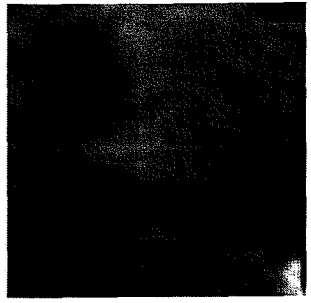
FIG. 4H
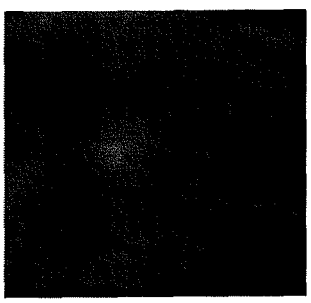
FIG. 4G
FIG. 4F
FIG. 4E
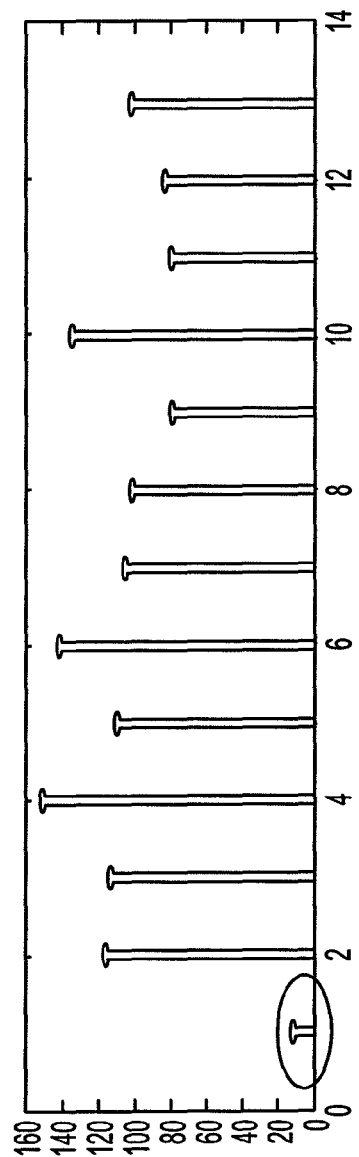
FIG. 4I

ULTRA-LOW DIMENSIONAL REPRESENTATION FOR FACE RECOGNITION UNDER VARYING EXPRESSIONS

CROSS-REFERENCE TO RELATED APPLICATIONS

This application claims benefit of and priority to U.S. Provisional Patent Application Ser. No. 61/185,367, filed Jun. 9, 2009, which is fully incorporated herein by reference, and made a part hereof.

FIELD

Embodiments of the invention relate, generally, to face recognition and, in particular, to expression-invariant face recognition based on Compressive Sensing theory.

BACKGROUND

Face recognition (FR) has been a highly active research area for many years. A typical approach involves two tasks: feature extraction and classification. Commonly-used feature extraction methods include subspace techniques such as principle component analysis (PCA or eigenface), independent component analysis (ICA), linear discriminant analysis (LDA or fisherface), and so on [1, 2]. With features extracted, classifiers based on techniques such as nearest neighbor and/or support vector machines can then be used to perform recognition. The above feature extraction methods are well-understood and in a sense have reached their maturity. Researchers are now looking for different methods and theories to address the persisting challenges in FR, such as expression, illumination and pose variation, dimensionality reduction, and/or the like. In addition, reducing the space complexity and, in particular, the operational dimensionality of the classifier may be important for practical applications involving large databases.

A need, therefore, exists for FR techniques that address these and other issues.

BRIEF SUMMARY

In general, embodiments of the present invention provide an improvement by, among other things, providing a novel technique for expression-invariant face recognition based on the recently-emerged Compressive Sensing (CS) theory [6, 10, 12-16]. In particular, according to embodiments of the present invention, one or more different images of the same subject can be viewed as an ensemble of inter-correlated signals, and changes due to variation in expressions can be assumed to be sparse with respect to the whole image. This sparsity can then be exploited using distributed compressive sensing theory, which enables the gross representation of the training images of a given subject by only two feature images: one that captures the holistic (common) features of the face, and the other that captures the different expressions in all training samples.

According to embodiments of the present invention, a new test image of a subject can be fairly well approximated using only the two feature images from the same subject. Hence, using the FR technique of embodiments described herein, and keeping only these two feature images or their random measurements, the storage space and operational dimensionality can be drastically reduced. Based on this, according to embodiments of the present invention, an efficient expression-invariant classifier can be designed. Furthermore, as described below, substantially low dimensional versions of the training features, such as (i) ones extracted from critically-down-sampled training images, or (ii) low-dimensional random projection of original feature images, still have sufficient information for good classification. Extensive experiments with publicly-available databases show that, on average, the approach of embodiments described herein performs better than the state-of-the-art, despite using only such supercompact feature representation.

In accordance with one aspect a facial recognition method is provided. In one embodiment the facial recognition method may include: (1) receiving a plurality of images depicting a subject; (2) deriving, by a processor, a common component image associated with the subject, wherein the common component image captures one or more features common to all images in the plurality of images; and (3) deriving, by the processor, a gross innovation component image associated with the subject, wherein the gross innovation component image captures a combination of one or more features unique to respective images of the plurality of images. In one embodiment, the subject can be identified in a new input image based on the common component image and the gross innovation component image.

In accordance with another aspect, an apparatus configured to perform facial recognition is provided. In one embodiment the apparatus may include a processor configured to: (1) receive a plurality of images depicting a subject; (2) derive a common component image associated with the subject, wherein the common component image captures one or more features common to all images in the plurality of images; and (3) derive, a gross innovation component image associated with the subject, wherein the gross innovation component image captures a combination of one or more features unique to respective images of the plurality of images. In one embodiment, the subject can be identified in a new input image based on the common component image and the gross innovation component image.

In accordance with yet another aspect, a computer program product for performing facial recognition is provided. The computer program product contains at least one computer-readable storage medium having computer-readable program code portions stored therein. The computer-readable program code portions of one embodiment include: (1) a first executable portion for receiving a plurality of images depicting a subject; (2) a second executable portion for deriving a common component image associated with the subject, wherein the common component image captures one or more features common to all images in the plurality of images; and (3) a third executable portion for deriving a gross innovation component image associated with the subject, wherein the gross innovation component image captures a combination of one or more features unique to respective images of the plurality of images. In one embodiment, the subject can be identified in a new input image based on the common component image and the gross innovation component image.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

FIGS. 1A-1C provide sample face images with expressions from [9], [8] and [7], respectively;

FIGS. 2A-2C provide images of the same subject with different expressions;

Figure 3A:
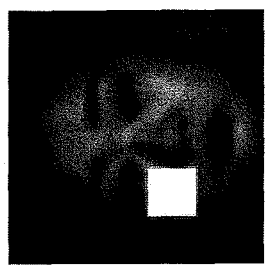
Figure 3B:
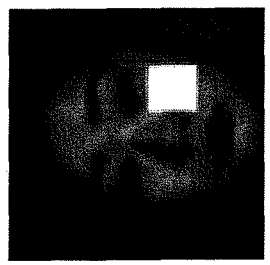
Figure 3C:
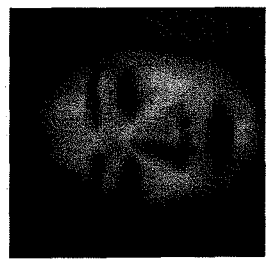
Figure 3D:
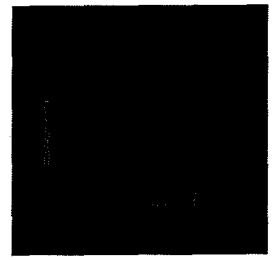
Figure 3E:
Figure 3F:
Figure 3G:
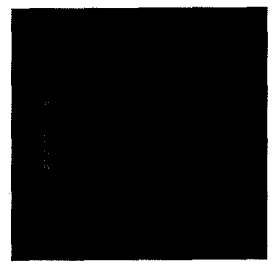
Figure 3H:
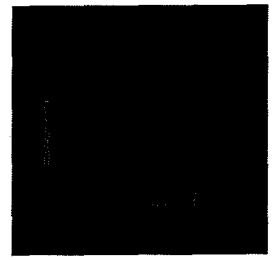
Figure 5A:
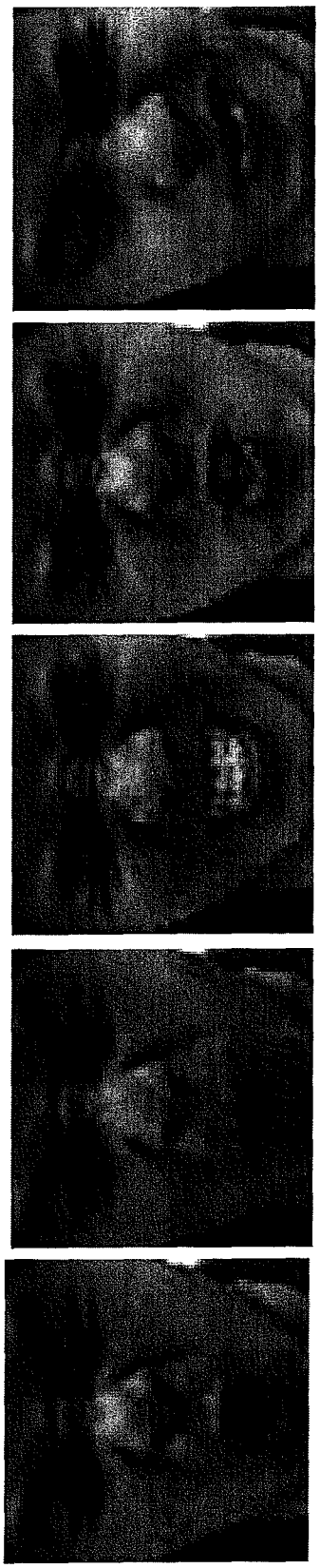
Figure 5B:
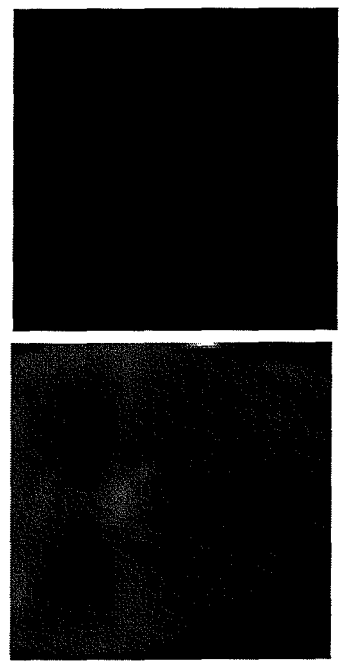
Figure 5C:
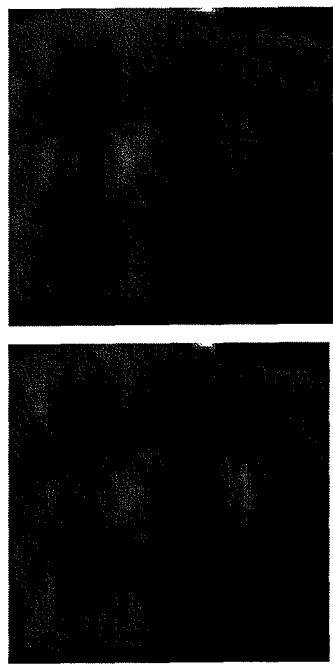
Figure 5C:
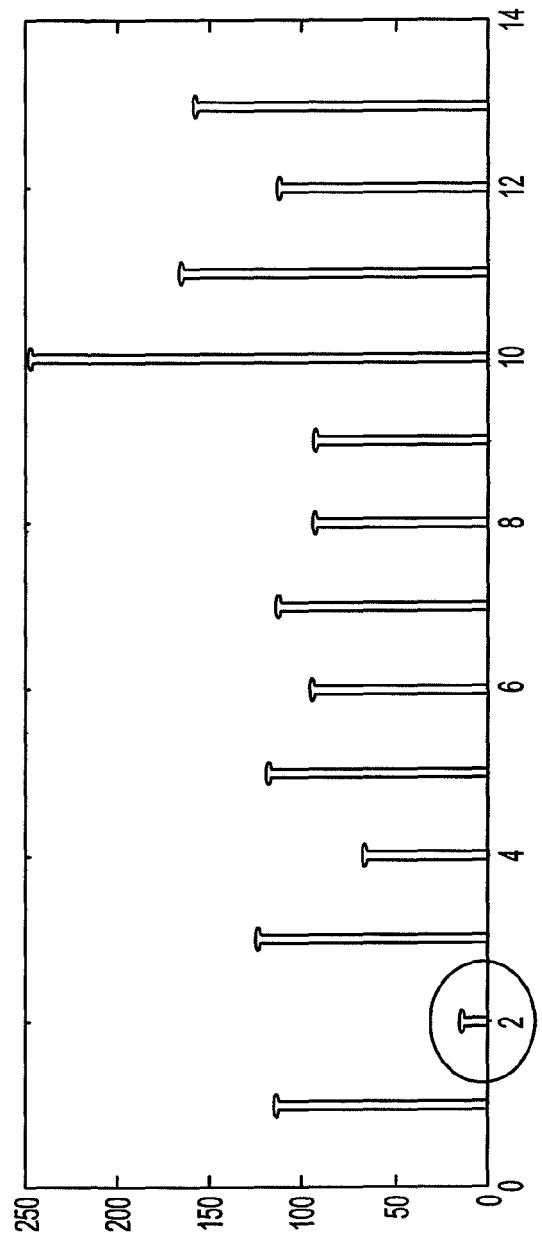
Figure 5D:
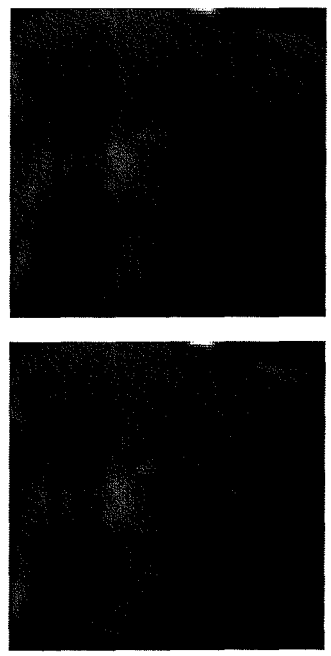
Figure 5D:
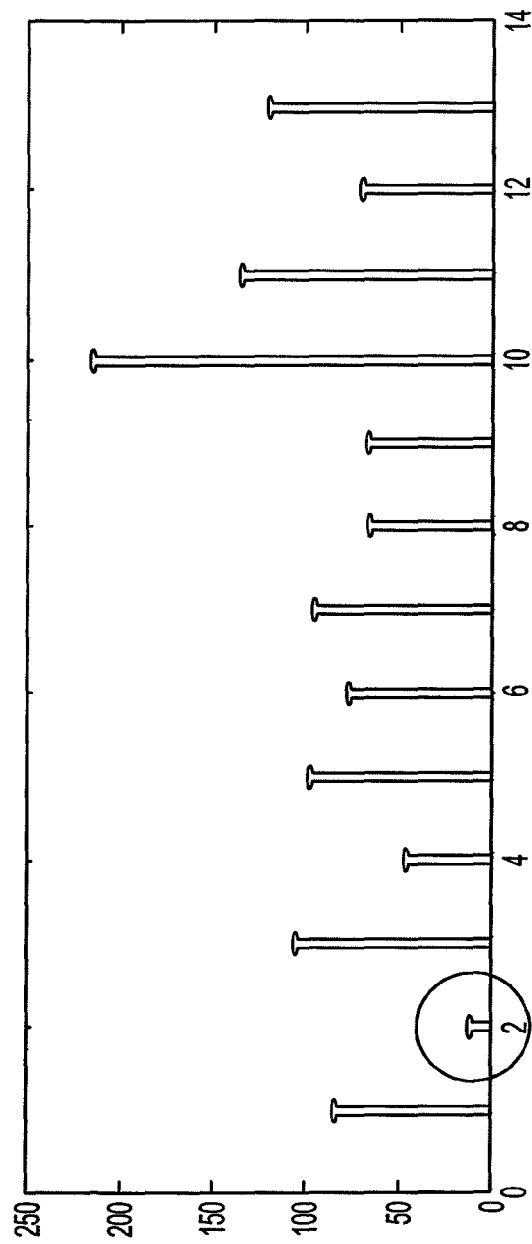
Figure 5E:
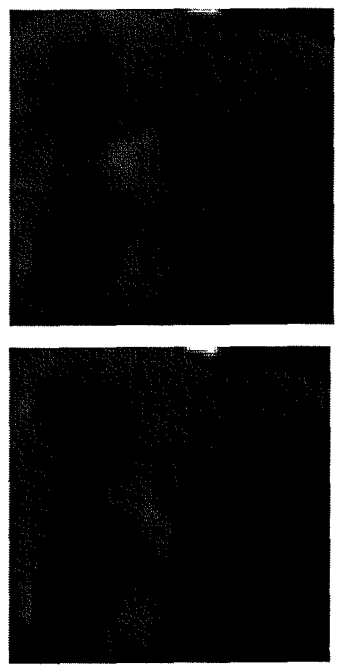
Figure 5E:
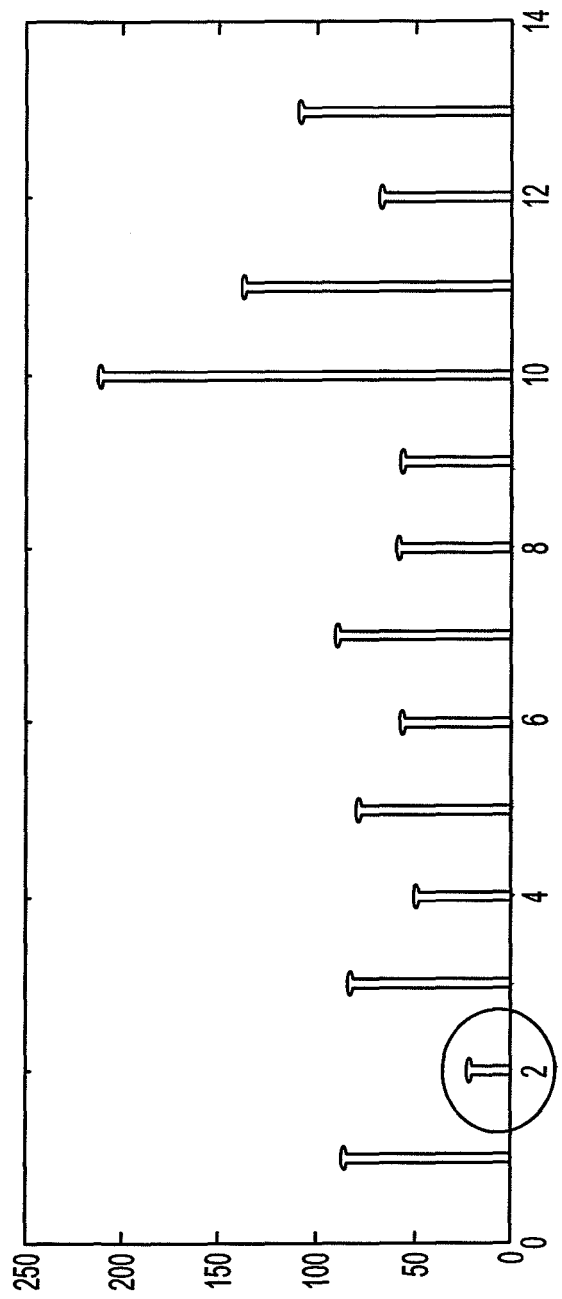
Figure 6B:
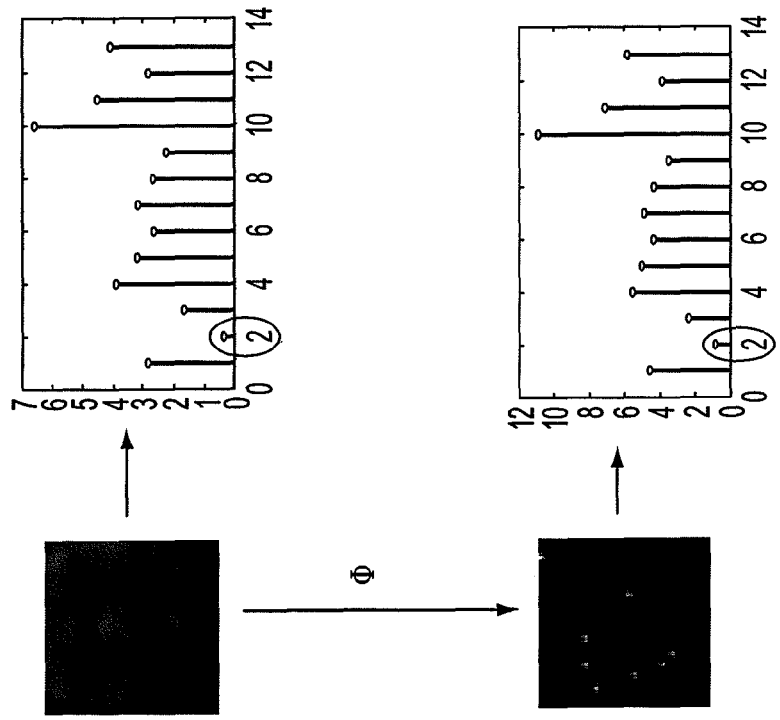
Figure 6A:
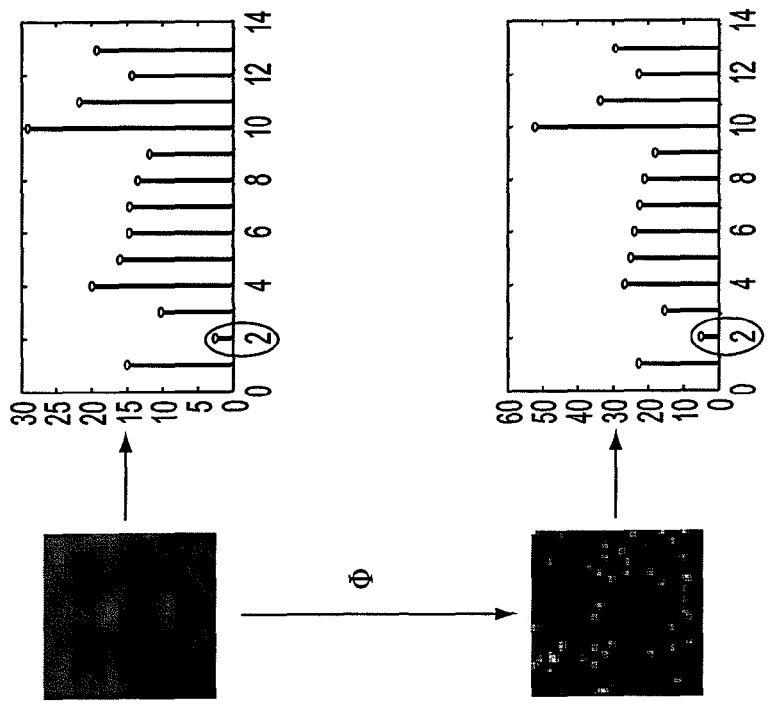
Figure 7A:
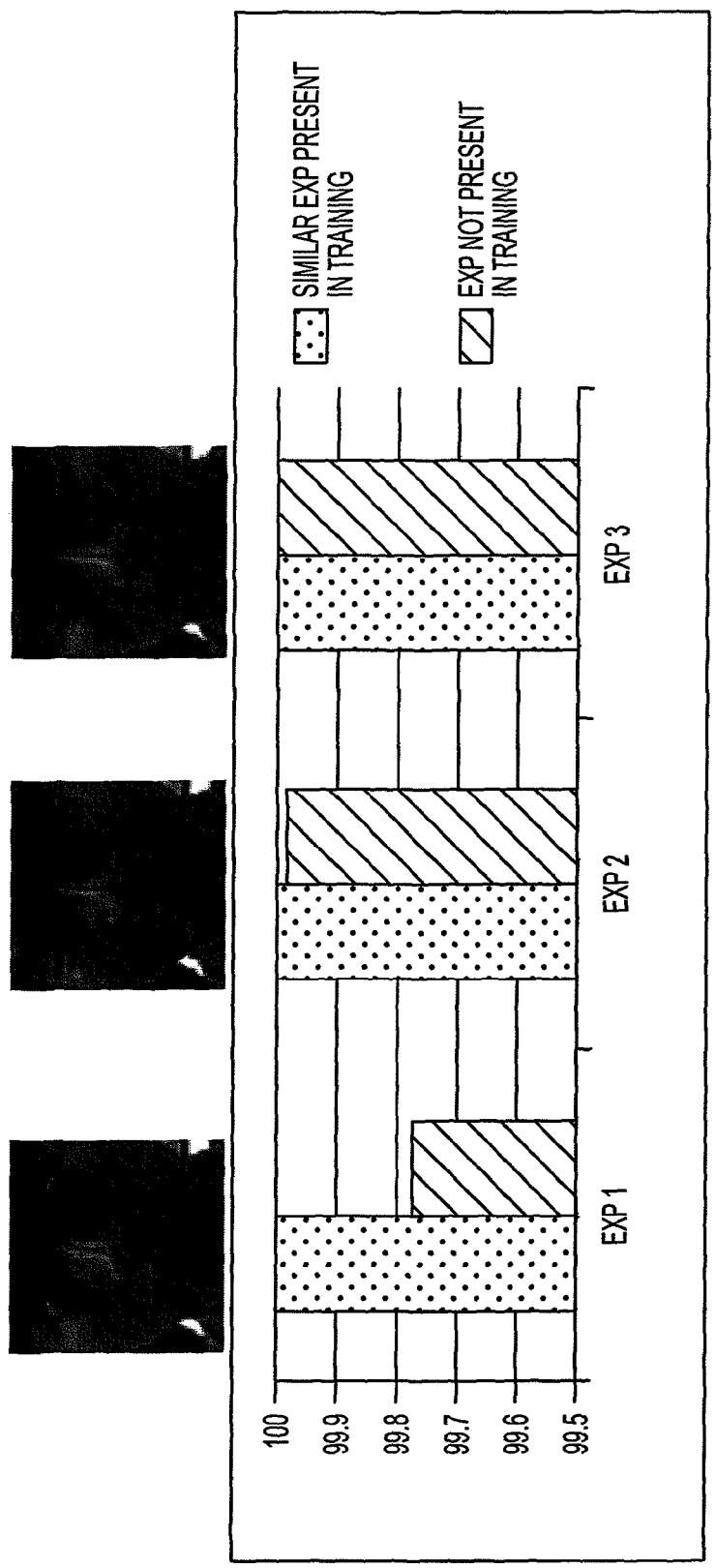
Figure 7B:
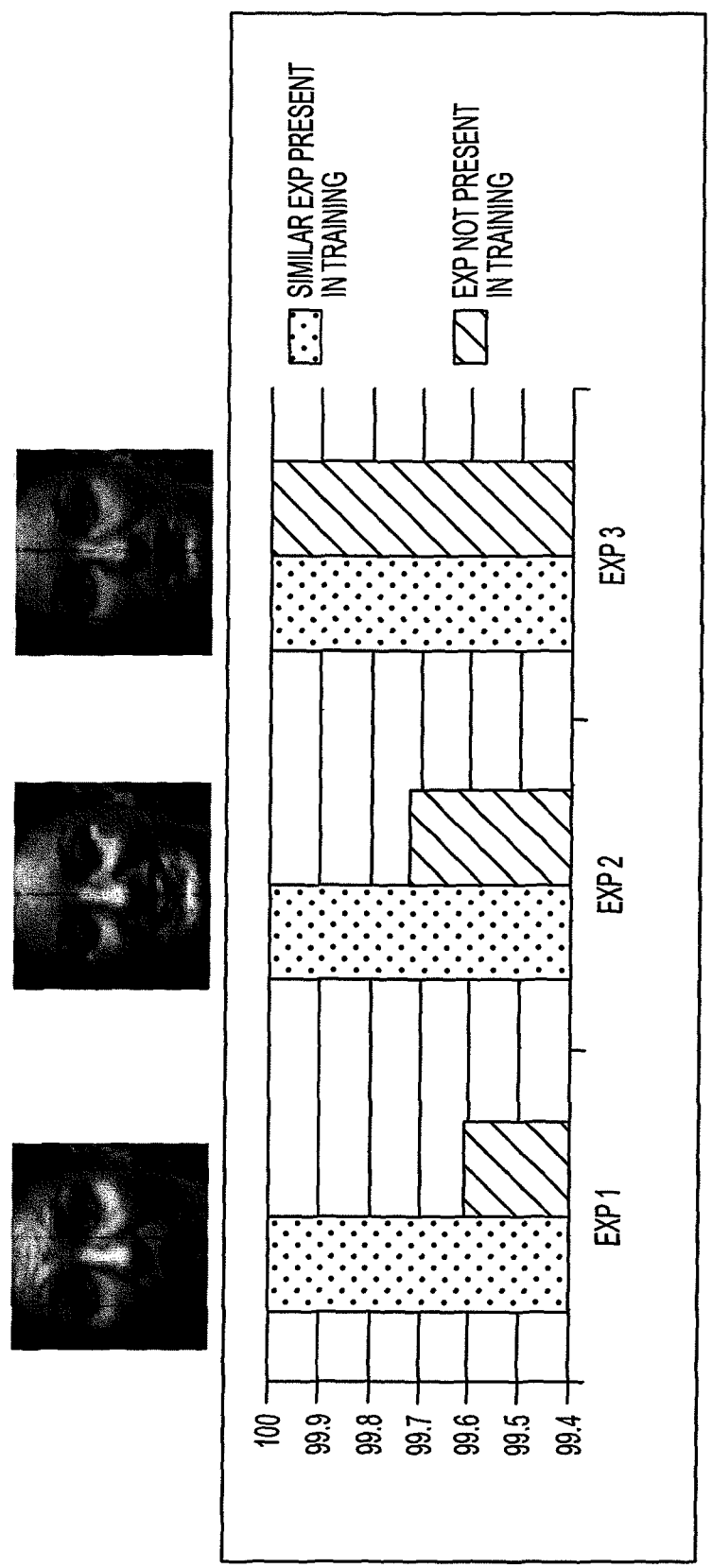
Figure 7C:
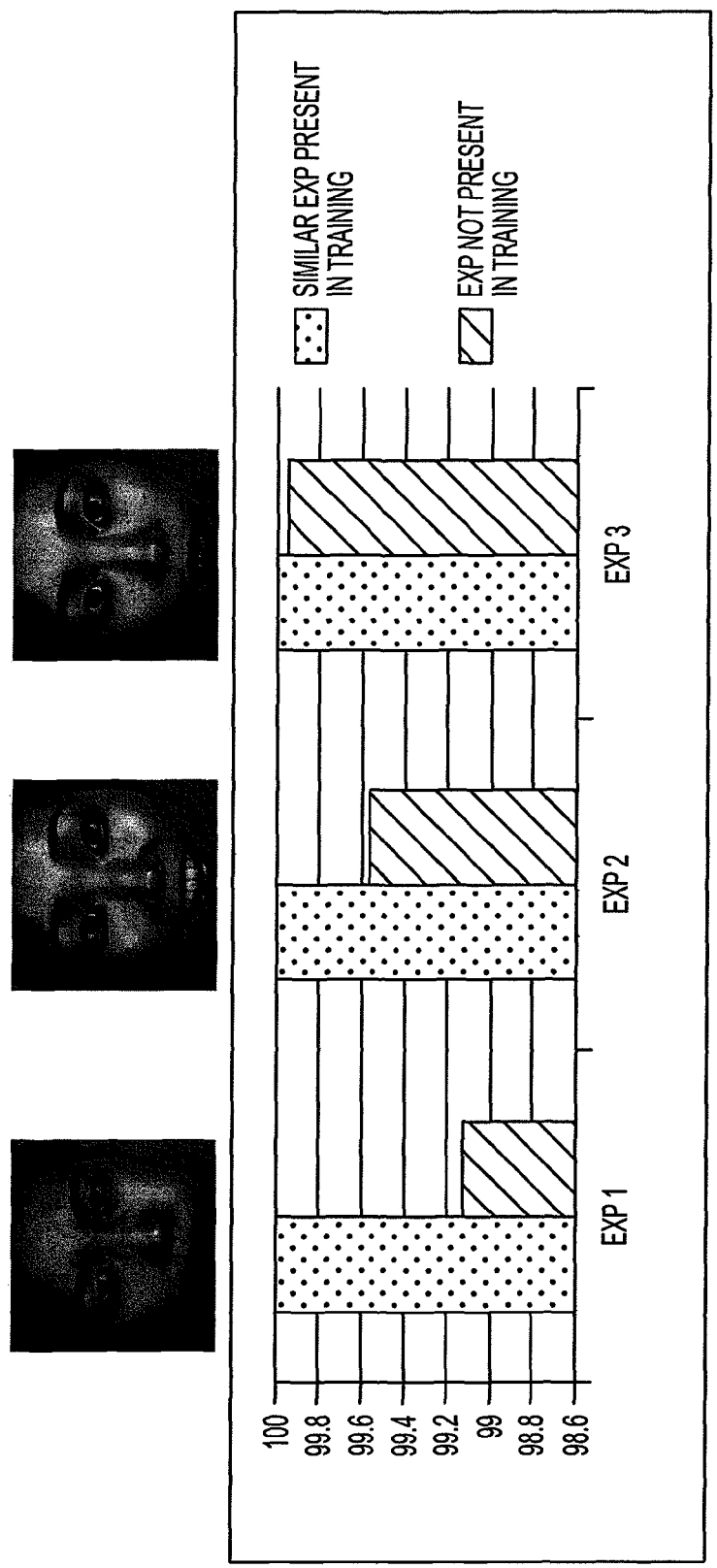

FIGS. 3A-3C provide the same image of a single subject with added white patch (innovations), in accordance with an embodiment of the present invention;

FIG. 3D provides the obtained common component of the images of FIGS. 3A-3C, in which even the skin texture at the patches is nearly retained, in accordance with an embodiment of the present invention;

FIGS. 3E-3G illustrate the innovation components of the images of FIGS. 3A-3C, respectively, each retaining an innovation as gray patches (white patch subtracted with the intensity of skin regions of patches), in accordance with an embodiment of the present invention;

FIG. 3H illustrates the sum of the innovation components of FIGS. 3E-3G, which can serve as a global representation of the innovations of all images, in accordance with an embodiment of the present invention;

FIG. 4A illustrates five training images of class 1 (from CMU AMP EXpression database [7] with 13 subjects), in accordance with an embodiment of the present invention;

FIGS. 4B & 4C illustrate one sample training image of classes 2 & 3, respectively, in accordance with an embodiment of the present invention;

FIG. 4D illustrates the feature images computed from the image of FIG. 4A, in accordance with an embodiment of the present invention;

FIG. 4E provides a sample test image, in accordance with an embodiment of the present invention;

FIG. 4F illustrates the estimate of the test image of FIG. 4E with recovered expressions using class 1 training features of FIG. 4D, in accordance with an embodiment of the present invention;

FIGS. 4G & 4H provide estimates of the test image of FIG. 4E with recovered expression using class 2 and class 3 training features, respectively, in accordance with an embodiment of the present invention;

FIG. 4I provides the residuals computed from Eqn. (17), discussed below, which can be used to determine the correct class, in accordance with an embodiment of the present invention;

FIGS. 5A-5E provide an illustration of image recovery and classification under drastic expressions (13 subjects, five training samples each), in accordance with embodiments of the present invention, wherein FIG. 5A provides training images of class 2 (discussed below); FIG. 5B illustrates the training features of the training images of FIG. 5A; and FIGS. 5C-5E each provide an actual test image of class 2 (left), the reconstructed image using class 2 features of FIG. 5B (right), and the residual of Eqn. (17) (discussed below) for all thirteen classes;

FIGS. 6A & 6B illustrate image recognition with critically low-dimensional features, in accordance with embodiments of the present invention, wherein for both FIGS. 6A and 6B, the top-left image is the input image (using 32×32=1024 points and 16×16=256 points, respectively), and the bottom is its 10% measurement (using 102 and 25 feature points, respectively), and on the right are the residuals;

FIGS. 7A-7C illustrate the recognition rate with and without the presence of similar expressions in the training set—(Surprise (left), Happiness (middle) and Neutral (right)), in accordance with embodiments of the present invention, for the CMU, CK, and JAFEE databases (discussed below), respectively.

Figure 8:
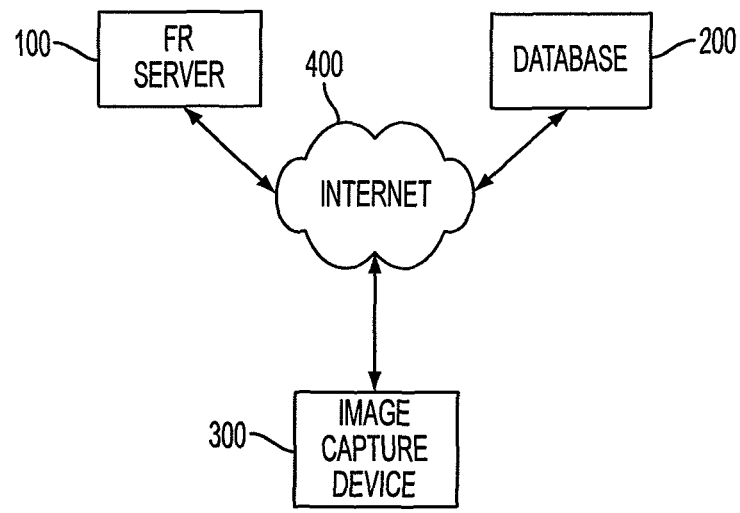
Figure 9:
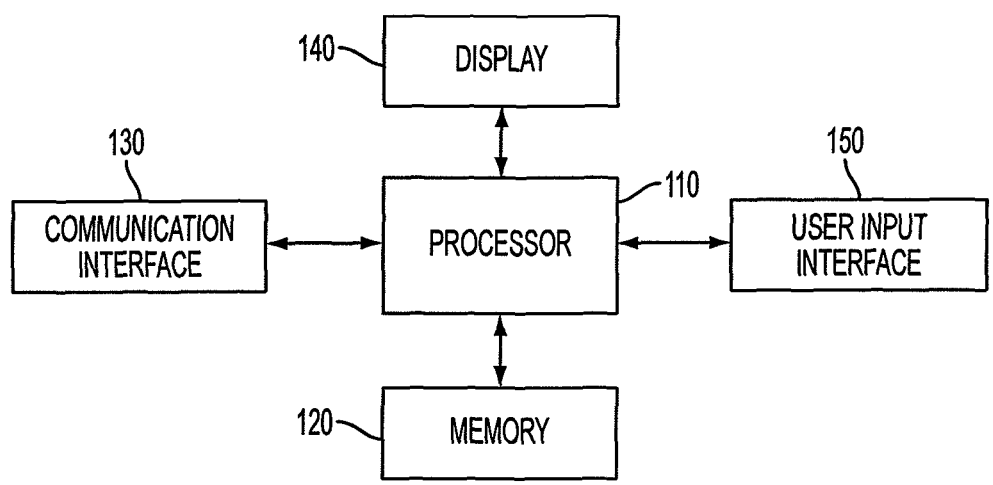
Figure 10E:
Figure 10D:
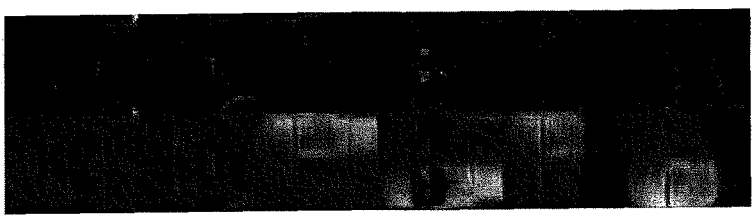
Figure 10C:
Figure 10B:
Figure 10A:
Figure 11:
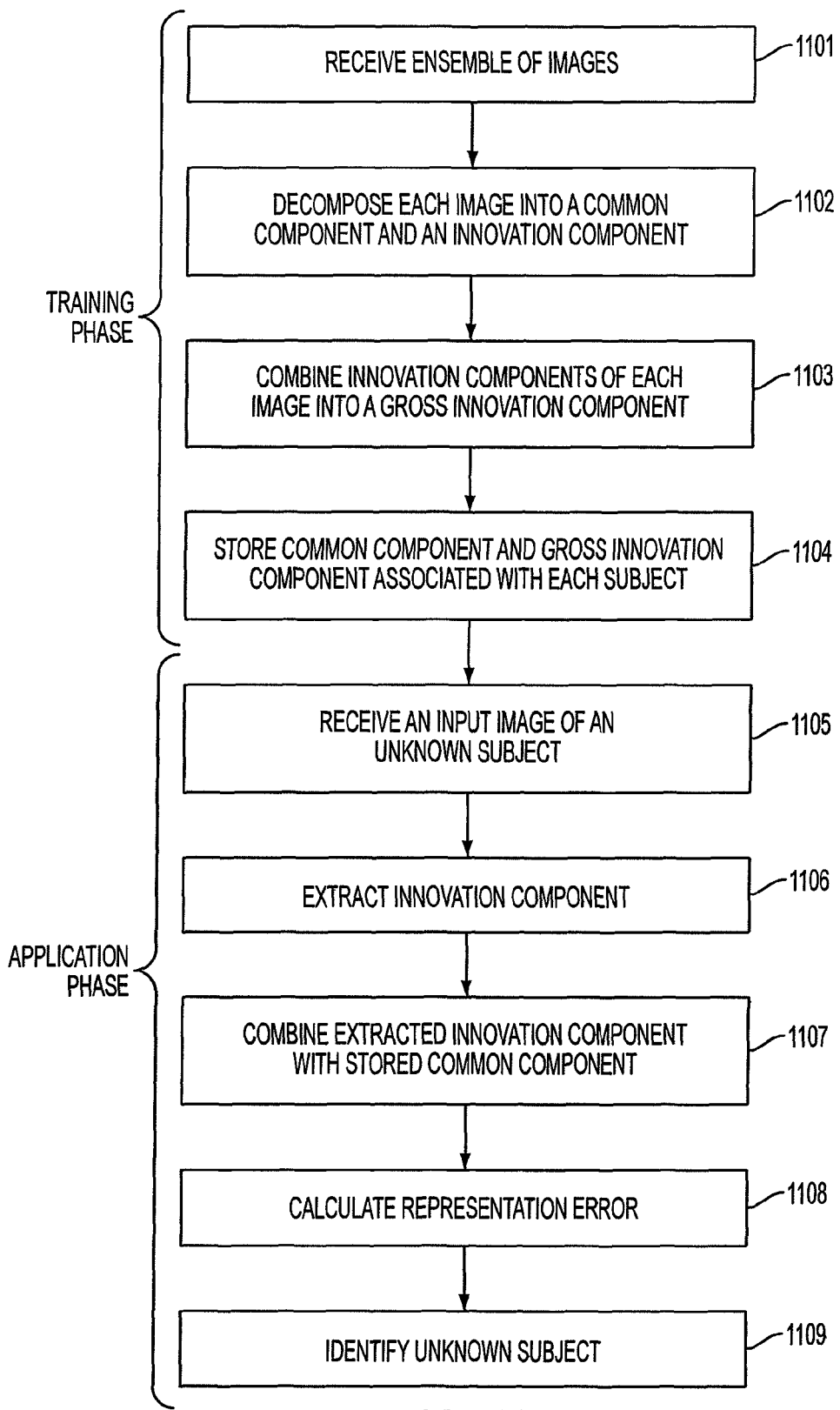

FIG. 8 is a block diagram of one type of system that would benefit from embodiments of the present invention;

FIG. 9 is a schematic block diagram of an entity capable of operating as a FR server in accordance with embodiments of the present invention;

FIG. 10 provides sample results of one embodiment described herein in which differing expressions, as well as differing illumination conditions and/or occlusions are taken into consideration; and FIG. 11 is a flow chart illustrating the process of identifying an unknown subject in accordance with an embodiment described herein.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Figure 1A:
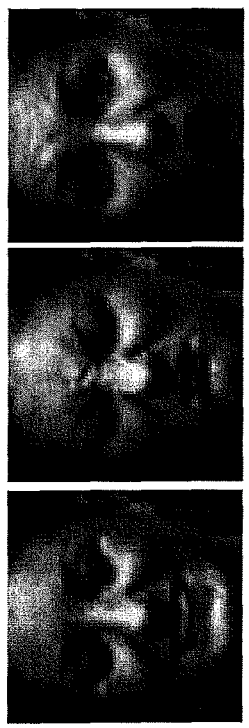
Figure 1B:
Figure 1C:
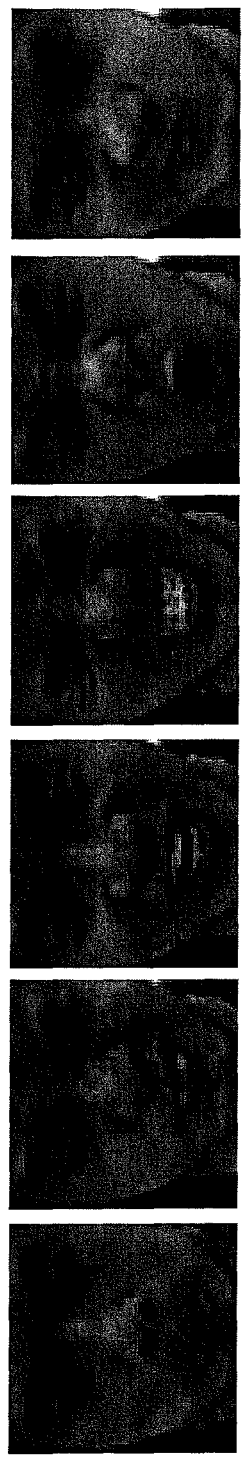

Overview:

In general, embodiments of the present invention provide a new technique for face feature extraction and classification, based on the Compressive Sensing (CS) theory, wherein a focus of the technique is on addressing expression variation in face recognition (FR). Expression-invariant FR is a challenging task owing to the complex and varied nature of facial expressions. Some sample face images are shown in FIGS. 1A-1C to illustrate the complexity of the problem. The method of one embodiment described herein relies on distributed CS and joint sparsity models (JSM) [5, 10]. The JSM was originally proposed for efficient coding of multiple inter-correlated signals. According to embodiments of the present invention, the JSM can be formulated from a "representation" perspective so that it can be readily applied to computer vision problems requiring compact representation of multiple correlated images, such as instances of the same face in the context of FR. Further, embodiments of the present invention can include the design of feature extraction and classification algorithms based on the formulation. Unlike existing FR work based on sparse representation (e.g., [3]), the approach of embodiments of the present invention has a natural and close knit relationship with the CS theory, and thus many potential benefits of CS apply (e.g., projecting the input image into ultra-low dimensions, as discussed below).

Specifically, embodiments of the present invention consider the training face images of a single subject as an ensemble of inter-correlated signals and propose a technique to represent each subject class with two feature images: (i) one that captures holistic or gross face features (the common component) and (ii) the other that captures mostly the unique features (like expressions) of all images in a single image (the gross innovation component). Then, a CS-based reconstruction algorithm can be designed that can produce a close approximation of a new face image of the subject, using only the two training features. In particular, the algorithm of one embodiment of the present invention can first produce an approximation of expressions in the new face image using the gross innovation feature and then use this with the common component to reconstruct the given face image. In one embodiment, a face classifier can be designed based on the same principle, where the class of the test image can be decided based on how well it can be approximated using the training features of labeled classes.

Since embodiments of the present invention involve the storing of only two feature images per subject (or their low dimensional measurements), the training set storage space and the operational dimensionality of the classifier can be drastically reduced, compared with the sparse-representation-based algorithm of [3], while achieving better performance than the state-of-the-art results reported therein. Further, the method of embodiments described herein is more robust in scenarios where only a few samples are available for training.

Background and Related Work

The following provides a brief review of the basics of the CS theory and then a discussion of one most recent work on FR based on sparse representation and CS.

According to the CS theory, if a signal $x \in R^N$ is K-sparse, with respect to a basis $\Psi \in RN$ (i.e., in the expansion $\theta = \Psi^T x$, there are only K<N non-zero or significant coefficients), then x can be recovered by its measurement $y \in R^M$. M<N, obtained by projecting x onto a second basis $\Phi \in R^{M \times N}$, as long as (i) $\Phi$ and $\Psi$ are incoherent and (ii) M is of the order$\geq$K log(N) [6,10,12-16]. Mathematically, if the measurement is written as $y = \Phi x$, $y \in R^M$, then the signal recovery can be done by convex $l^1$ optimization:

$$\hat{\theta} = \operatorname{argmin} \|\theta\|_1 \, s.t. \, y = \Phi \Psi \theta \quad (1)$$

$$\text{or } \hat{\theta} = \operatorname{argmin} \|\theta\|_1 \, s.t. \, \|y - \Phi \Psi \theta\|_2 \epsilon \quad (2)$$

Eqn. (1) is the Basis Pursuit problem and Eqn. (2) is the Basis Pursuit Denoising problem, which is well suited in cases where the measurements are noisy. A popular approximation equivalent to (2) is the unconstrained version given by $$\hat{\theta} = \operatorname{argmin}\{\tau \|\theta\|_1 + 0.5 * \|y - \Phi \Psi \theta\|_2^2\} \quad (3)$$

There are efficient algorithms that use interior-point methods to solve the $l^1$ minimization of (1) and (2). One of the earlier implementations is $l^1$-magic [18] which recasts these problems as a second-order cone program and then applies the primal log-barrier approach. More recent interests are in sparse recovery algorithms solving the unconstrained optimization of (3), since it is much faster than directly solving (1) or (2). Gradient Projection for Sparse Reconstruction (GPSR) [11] is one such more recent algorithm, which is reported to outperform prior approaches [17].

Recently, an FR algorithm (called SRC) based on ideas of sparse representation and CS that appears to be able to handle changing expression and illumination was proposed [3]. The work was enhanced by another paper [4] to handle pose variation. In the SRC algorithm, it is assumed that the whole set of training samples form a dictionary (each image is a base atom), and then the recognition problem is cast as one of discriminatively finding a sparse representation of the test image as a linear combination of training images by solving the optimization problem in (1), (2) or (3). While the SRC model demonstrates the power of harnessing sparsity in face recognition problem via $l^1$ minimization, it has some disadvantages. First, for accurate recognition, sufficiently large training images for each subject are needed. But in practice, only a few instances might be available for a few or even all of the subjects. Second, all training images (or their low dimensional versions) have to be stored and accessed during testing, and thus for a large training set, both the space complexity and the speed performance may pose as practical challenges.

Nevertheless, the comparison with other existing approaches in [3] suggests that the SRC algorithm is among the best and thus it is treated as the state-of-the-art and will be used as a bench mark in the study described herein.

Face Feature Extraction and Training

A problem of recognition of an unknown object is to correctly identify the class to which it "belongs," using some information derived from labeled training samples belonging to K distinct classes. As used herein, "feature extraction" is referred to as training. The following proposes a feature extraction algorithm based on the JSM CS recovery scheme [5,10], in accordance with an embodiment of the present invention. According to this embodiment, the algorithm can find the common (holistic) and innovation components, with the latter corresponding to expressions, of all training images of class k. Since, in one embodiment described herein, a sparsifying basis (like Discrete Cosine Transforms (DCT)) is used, this can be termed as "B-JSM feature extraction."

B-JSM Feature Extraction

To present the idea, first assume a grayscale image represented as 1-D column vector $x \in R^N$, $N = N_1 \times N_2$. The extension of the presented idea to 2-D is straightforward. Since, according to one embodiment of the present invention, the features of interest lie in the textures but not the intensity of an image, one can assume that x has its mean intensity subtracted. One can further assume that there are K distinct classes (i.e., subjects), with each class having $J_k$ training images, k=1, 2, ..., K. Let the images of class k be represented as an ensemble $\{x_{k,j}\} f = 1, \ldots, J_k$, or simply $\{x_{k,j}\}$. Jointly, such an ensemble can be represented as, $$y_k = [x_{k,1} x_{k,2} \ldots x_{k,J_k}]^T \in R^{N \times j_k} \quad (4)$$

Noting that all signals in $\{x_{k,j}\}$ for a given k are highly inter-correlated, the j-th training image of class k can be represented as the sum of a common component and an innovation component as follows, $$x_{k,j} = z_k^c + z_{k,j}^i \quad (5)$$

Further, let $\Psi \in R^{N \times N}$ be the matrix representation of some orthonormal basis (e.g., DCT) that can sparsely represent the training images, so that coefficients $X_{k,j} = \Psi x \in R^N$ of signal x can be written as, $$X_{k,j} = \theta_k^c + \theta_{k,j}^i \Psi z_k^c + \Psi z_{k,j}^i; \theta_k^c, \theta_{k,j}^i \in R^N \quad (6)$$

Here $\theta_k^c$ is common to all the $J_k$ training images of class k and $\theta_{k,j}^i$ j=1, ... $J_k$, is unique to each image. Under this model, let the common and innovation components of class k be jointly represented by the vector $$W_k = [\theta_k^c \theta_{k,1}^i \theta_{k,2}^i \ldots \theta_{k,J_k}^i]^T \in R^{N \times (j_k+1)} \quad (7)$$

Note that there might be more than one value[5] of $z_k^c$ or $\theta_k^c$ satisfying (5) or (6), but the one of interest for embodiments of the present invention is the component $\theta_k^c$ that is strictly derived from the common support in the ensemble $\{X_{k,j}\}$ such that the vector $W_k$ is the sparsest representation of $\{x_{k,j}\}$ (Eqn.(4)) under the basis $\Psi$. For highly correlated signals, naturally $\theta_k^c$ would be strong and relatively denser compared to the very sparse innovations. From a feature extraction point of view, for FR with varying expression, this representation can be useful since the common component $z_k^c$ would retain all the gross common face features (holistic), while the innovation components $z_{k,j}^i$ retain the unique features owing to changes in facial expressions. An example of such a representation is shown in FIGS. 2A-2H and will be discussed in more detail below.

In the distributed CS theory of [5,10], the additive model of (5) was assumed in the sense of "jointly recovering" correlated signals from measurements, which would help reduce the number of measurements in coding of multi-sensor signals. In embodiments of the present invention, a new representation of $\{x_{k,j}\}$ given in (7) can be formed so as to use the common and innovation features for facilitating the FR task. From (4)-(7), one can write, $$y_k = \tilde{\Psi} W_k \quad (8)$$

where $\tilde{\Psi} \equiv [[l_1] \ [l_2]]$ is formed by concatenating two matrices given by $l_1 = [\Psi^T \ \Psi^T \ \ldots \ \Psi^T]^T \in \mathbb{R}^{(J_k \times N) \times N}$ and $l_2 = \text{diag}(l_1) \in \mathbb{R}^{(J_k \times N) \times (J_k \times N)}$, with $\text{diag}^{(p)}$ being a diagonal matrix whose diagonal elements are $p_1, p_2 \ldots p_N$ in $p = [p_1 \ p_2 \ldots p_N]^T$. Note that $l_1$ and $l_2$ correspond to the common and innovation components respectively. The $W_k$ vector can be found by solving the following $l^1$-minimization problem, $$W_k = \arg\min \|W_k\|_1 \, s.t. \, y_k \tilde{\Psi} W_k \text{ or } W_k = \min\{\tau \|W_k\|_1 + 0.5 * \|y_k - \tilde{\Psi} W_k\|_2^2\} \quad (9)$$

The spatial domain common and innovation components can be recovered by the inverse transformation as, $$w_k = \Lambda W_k \quad (10)$$

where $A = \text{diag}([\Psi^T \ \Psi^T \ldots \Psi^T]^T) \in \mathbb{R}^{(J_k \times N) \times (J_k \times N)}$ and $w_k = [z_k^c \ z_{k,1}^i \ldots z_{k,J_k}^i]^T \subset \mathbb{R}^{N \times (J_k+1)}$. For convenience and future reference, the process described by the sequence of equations (8)-(10) for class k can be represented as $$B\text{-}JSM := (\{x_{k,j}\}, j=1, \ldots, J_k) \rightarrow [z_k^c \ldots z_{k,J_k}^i]^T \quad (11)$$

According to embodiments of the present invention, the last step in feature extraction can be to form the gross innovation component denoted by $z_k^A$, (the superscript A standing for "all") that can be computed as, $$z_k^A = \sum_{j=1}^{J_k} z_{k,j}^i \quad (12)$$

For each class k, only two feature images can be stored: the common component $z_k^c$ and the gross innovation component $z_k^A$, while the training and other innovation images can be discarded. Hence, according to embodiments of the present invention, there can be a significant reduction in the total storage space compared with the SRC method of [3]. Further dimensionality reduction of feature space can be achieved by storing just sufficient random measurements of $z_k^c$ and $z_k^A$ instead of the whole feature images (see below for more on this). Since the innovations (changes in expressions) are sparse (and mostly with different support), the gross innovation component $z_k^A$ can capture most of the unique features of all images in one single image of the same size. There may be some loss of innovation information in the representation of (12), especially if $\theta^c$ is very sparse with a small support while the $\theta^i$'s are relatively dense with significant overlap in their support. However, for aligned face images of the same subject, one can expect $\theta_k^c$ to be dense with a significant support compared to the innovations. The representation of (12) indeed has sufficient information about the innovations (or expressions) of all training images for the purpose of face recognition according to embodiments of the present invention.

Figure 2A:
FIG. 2D illustrates the common component of the images of FIGS. 2A-2C or $z^c$ with mean added, in accordance with embodiments of the present invention.
FIGS. 2E-2G illustrate the innovation components of the images of FIGS. 2A-2C, respectively ($z_1^i$, $z_2^i$, $z_2^i$), in accordance with embodiments of the present invention.
FIG. 2H illustrates the sum of the innovation components of FIGS. 2E-2G (or $z^4$), which can serve as the global representation of the unique features of the images of FIGS. 2A-2C together, in accordance with embodiments of the present invention.
Figure 2B:
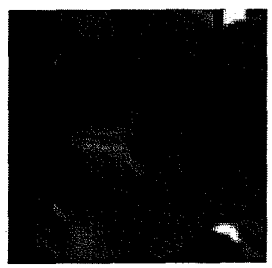
Figure 2C:
Figure 2D:
Figure 2E:
Figure 2F:
Figure 2G:
Figure 2H:

Referring to FIGS. 2A-2H, where there are three images of a subject with different expressions. (For visual clarity, the mean of individual training images and also the overall mean have been added back to the common component.) It can be seen that the common component of embodiments of the present invention can retain all the gross features like the face structure, nose region, and/or the like. The innovation components of embodiments of the present invention can retain unique features in respective images (for example, the raised eye-brows and open mouth of the second image in FIG. 2B are clearly captured in $z_2^i$ of FIG. 2F, and so on). The gross innovation image $z^A$ can capture most of the innovation features of all three images in FIGS. 2A-2C. As discussed below, according to embodiments of the present invention, given only these two features, sufficient innovation information (or expressions) of any image can be recovered and hence the image can be well estimated using (5).

S-JSM: A Special Case of B-JSM

A special case of the B-JSM feature extraction method described above is when the common and innovations are directly extracted from spatial image supports (referred to hereinafter as "S-JSM," with S standing for spatial). However, such an approach is sensitive to image alignment, while B-JSM is more robust if a basis like DCT, Wavelet, or the like is used. Nevertheless, this alternative is presented herein so as to provide better insights about the common and innovation features. For S-JSM, one can assume that the basis matrix $\Psi$ in Equations (1)-(10) is an identity matrix of size N. With these changes, $\theta_k^c = z_k^c$ and $\theta_k^i = z_k^i$ in (6) and the algorithm can be expressed as $$S\text{-}JSM := (\{x_{k,j}\}, j=1, \ldots, J_k) \rightarrow [z_k^c \ldots z_{k,j_k}^i]^T \quad (13)$$

FIGS. 3A-3F show an example of S-JSM features where white patches were intentionally added to the same image to simulate "innovations." (Again, for visual clarity the mean intensity has been added back.) In this embodiment, the common component retains almost all the information of the face (even the skin intensity at locations of the patches are closely recovered). The innovation component of an image retains the gray patch (which is the difference of the actual patch and the skin intensity at those pixel locations). Hence these effectively carry the information of the original white patches, given the common component. FIG. 3F shows that the gross innovation of embodiments of the present invention can retain all the three gray patches which are unique features of all images. This intuitively illustrates the earlier argument about why the gross innovation is sufficient as long as the individual innovations are sparse (with the hope that the overlap of the innovations should have been captured by the common component).

Face Classification:
Expression Recovery and B-JSM Classifier

With the given training features (the common and gross innovation images), there can be many different ways to design a classifier in accordance with embodiments of the present invention. Let $C \in \mathbb{R}^N$ be a test image of unknown class. One simple way is to assume that c is highly correlated with the correct training class (say class k), and hence it would have the same common component $z_k^c$ if the ensemble $\{x_{k,j}, c\}, j=1, 2, \ldots j_k+1$ is considered. So the test image c can be expressed as $$c = z_k^c + c_k^i \quad (14)$$

where $c_k^i$ is the innovation of c. In reality, it may be necessary to determine the correct class label k, which may be found as the k for which the energy (or $l^2$ norm) for $c_k^i$ is minimum. Another approach would be to simply consider sparsity or number of non-zero components of the expansion of $c_k^i$ in basis $\Psi$. However, these methods ignore the information from the gross innovation component $z_k^A$. A better approach might be to first ask the question—"If any at all, what unique feature present in the test innovation $c_k^i$ is also present in $z_k^A$?" In other words, it may be desirable to find the estimate of the innovation component $c_k^i$ of (14) (or expressions) in the test image c using the training features. Assuming B-JSM feature extraction, a good way to estimate $c_k^i$ is to extract a common component $F_k = \Psi f_k$ from the support set common between $c_k^i$ ($C_k^i = \Psi c_k^i$) and $Z_k^A$ ($Z_k^A = \Psi z_k^A$). This can be achieved using the B-JSM recovery model in (11) as follows, $$B\text{-}JSM(\{c_k^i, z_k^A\}) \to [f_k, f_k^i, z_k^{iA}]^T \quad (15)$$

where $f_k^i$ and $z_k^{iA}$ are innovations of $c_k^i$ and $z_k^A$. The estimate of the test image for class k features can be formed as, $$\hat{c}_k = z_k^c + f_k \quad (16)$$

The correct class label can then be determined as, $$l = \operatorname{argmin}_k(\|\hat{c}_k - c\|_2) \quad (17)$$

FIGS. 4A-4I illustrate the results of expression recovery and the classification algorithm explained above for images from the CMU AMP EXpression database [7] (thirteen subjects with five training images chosen per subject) in accordance with an embodiment of the present invention. FIG. 4A shows all five training images of one subject labeled as class 1 with different expressions. Note that in this case the training common shown in FIG. 4D is visually closer to the training images compared to the case in FIGS. 2A-2H. It is difficult to visually interpret the gross innovation image (FIG. 4D, right) since it contains a lot of information. Nevertheless, according to embodiments of the present invention, with the algorithm described above, the innovation information or expressions of a new test image of the correct class (FIG. 4E) can be well recovered, as in FIG. 4F. On the other hand, for images of the wrong classes (e.g., FIGS. 4B and 4C), the reconstruction is poor (as in FIGS. 4G and 4H).

A more challenging case is shown in FIGS. 5A-5E, illustrating the algorithm performance under drastic variation in expression. Despite the challenge, the expression is fairly well recovered and the classifier residual is very small for the correct class compared to the other classes, leading to correct classification. Note that, in FIG. 5E, the test image has a totally different expression that is not present in any of the training images. However, the classifier still yields the correct result. This can be attributed to the dominance of the "common component" over the innovations in terms of information for discriminative classification. However, if full or part of expression information is recovered, the discrimination would be more pronounced (compare the residuals of all three test images in FIGS. 5A-5E). Hence, the B-JSM classifier of embodiments described herein is robust even in cases where the expression information is missing in the training set. One such practical case is when only a few training images (per subject) are available.

Low-Dimensional Feature Subspace

The foregoing has presented a CS-based algorithm for feature extraction and classification in accordance with an embodiment of the present invention, but has not explicitly considered the underdetermined or ill-poised case involving reduced measurement as in conventional CS coding problems [5,6,10,14-16]. With sparsity prior, (under mild conditions as suggested in CS theory [6,15,16]), significant dimensionality reduction in the feature space can be handled by the B-JSM algorithm of embodiments described herein. This can be explained considering (5), (14) and (15). As discussed above, the $J_k$ innovations $\theta_k^i$ of (5) (for class k) may be very sparse with respect to the whole image. Suppose that the test image c belongs to class k, then one can assume that it is sufficiently correlated with the training images (i.e., the training common $z_k^c$ is significant in c), which means that $c_k^i$ in (14) is also very sparse with its sparsity of the order comparable to any training innovations $z_{k,j}^i$. Essentially, in the B-JSM expression recovery of (15), a highly sparse signal can be estimated, and hence the estimate of c via (16) can be done in a lower-dimensional feature space than the original ($z_k^c$ and $z_k^A$). Furthermore, since an emphasis is on classification alone, and not the fidelity of reconstruction, there is more scope for descending down to extreme low-dimensions.

Let the dimensionality reduction system be $\Phi \in R^{M \times N}$ ($\Phi$ can be random or any matrix highly incoherent with $\Psi$), a low-dimensional projection of the test image is, $$\tilde{c} = \Phi c \in R^M \quad (18)$$

And the low dimensional versions of the training features are $\tilde{z}_k^c$ and $\tilde{z}_k^{iA}$ given by, $$\tilde{z}_k^c = \Phi z_k^c, \tilde{z}_k^{iA} = \Phi z_k^{iA} \in R^M \quad (19)$$

These can be stored right after the training process discussed above. Then the B-JSM algorithm of (15) can be computed using the modified version of (9) as below, $$W_k = \min\{\tau \|W_k\|_1 + 0.5 * \|\tilde{y}_k - \Phi \tilde{\Psi} W_k\|_2^2\} \quad (20)$$

where $\tilde{y} = [(\tilde{c} - \tilde{z}_k^c) \; \tilde{z}_k^{iA}]^T \in R^{2M \times 1}$ and $W_k = [F_k, F_k^i, Z_k^{iA}]^T$ (the transform coefficients of the right hand side of (15). The estimate of the test image can then be determined by (16) as before.

FIGS. 6A and 6B illustrate the performance of the above algorithm in critically low dimensional feature space for the same setting as in FIGS. 5A-5E, in accordance with embodiments of the present invention. The original test image is of size 32×32, which is then down-sampled to 16×16. It is obvious that down-sampling does not change the residuals much. A $\Phi$ operator can be applied such that only 10% of the linear measurements are retained (102 features for the 32×32 case and merely 25 features for the 16×16 one). Again, the residuals do not alter much. Thus in all cases, correct classification is achieved (more results from entire databases are to be presented and discussed below).

Experimental Results and Evaluation:
Experimental Setup

The proposed algorithms described above were implemented for working with 2-D images instead of vectored images for speed consideration. Further, in all cases unless specified otherwise, the GPSR algorithm [11] was used to solve the unconstrained version if $l^1$ minimization in (9). (Similar results were obtained with other algorithms like TV minimization [12, 16].) For GPSR, $\tau$ was set to 0.009 and the continuation approach [11] with first $\tau$ factor $$\tau f = 0.8 \left( \max\left( \frac{|\Psi^T y_k|}{\tau} \right) \right)$$

was used. DCT was assumed as the sparsifying basis $\Psi$ in the algorithm of embodiments of the present invention. Although the sparsifying operation $X = \Psi x$) is not exactly equivalent to 1-D DCT on vectored image or 2-D DCT on 2-D image (but is actually 1-D DCT on columns of a 2-D image x), it yields satisfactory results.

Three face expression databases were used: (1) CMU AMP Face EXpression Database [7] (henceforth referred to as CMU), (2) Japanese Female Expression database [8] (henceforth JAFFE), and (3) Cohn-Kanade face expression database [9] (henceforth CK). The CMU database contains 975 images (13 subjects with 75 images per subject) with different facial expressions. The JAFFE database has 213 images with seven different expressions (10 female subjects). The CK database is the most challenging of the three, with 97 subjects and a total of 8795 images. Images of each subject were obtained in 5 to 9 sessions, each session having multiple instances of similar expressions. Since this is a large database, three sub-databases of 2317 images were created by sampling the original frames (uniformly for the first two, randomly for the third) for all subjects. The images were normalized. The results are compared with the most recent sparse representation-based face classification algorithm (SRC) [3], which reported results superior to other methods.

Experiments, Results and Comparisons

In all the experiments, the training set was formed by randomly selecting J images per subject, leaving the rest for testing. The experiments are summarized below.

Validation:

Validation was performed for various values of J with multiple repetitions for each J: J=4 to 10 for CMU, with 10 trials each; 2 to 5 for JAFFE, with 40 trials each; and 5 to 10 for CK with 9 trials, 3 from each sub-database. The statistics of the recognition rates (High, Low and Average) are given in Tables 1, 2, and 3, below, with comparison with the SRC algorithm. For CMU and JAFFE, 32×32 image size was used. The results with these two databases show that at a lower number of training images, the algorithm of embodiments described herein invariably outperforms the SRC algorithm and shows better stability. As the number of training images increase, the performance for both methods are on par for most trials, but the averages still indicate that the method of embodiments described herein is better. For the CK database, a critically low-dimensional image size of 7×7 (49 features) was considered. Invariably all times, the method of embodiments described herein outperforms the SRC algorithm in mean, low and high accuracies. Further, unlike the SRC algorithm, the method of embodiments described herein exhibits a clear trend of increase in accuracy with increased J.

Table 1, below, illustrates the recognition rate (%) for ten trials on the CMU database with 32×32 images:

|  | Proposed algorithm | | | SRC | | |
|---|---|---|---|---|---|---|
| $J_k$ | High | Low | Avg | High | Low | Avg |
| 4 | 100 | 97.48 | 98.95 | 100 | 97.68 | 98.9 |
| 5 | 100 | 99.67 | 99.91 | 100 | 99.12 | 99.8 |
| 6 | 100 | 99.69 | 99.97 | 100 | 98.76 | 99.75 |
| 7 | 100 | 100 | 100 | 100 | 98.30 | 99.74 |
| 8 | 100 | 100 | 100 | 100 | 99.31 | 99.87 |
| 9 | 100 | 100 | 100 | 100 | 100 | 100 |
| 10 | 100 | 100 | 100 | 100 | 98.73 | 99.49 |

Table 2, below, illustrates the recognition rate (%) for 40 trials on the JAFFE database with 32×32 images:

|  | Proposed algorithm | | | SRC | | |
|---|---|---|---|---|---|---|
| $J_k$ | High | Low | Avg | High | Low | Avg |
| 2 | 95.89 | 81.18 | 89.94 | 95.11 | 82.1 | 90.1 |
| 3 | 98.13 | 88.13 | 93.22 | 98.13 | 87.0 | 92.1 |
| 4 | 98.67 | 90.67 | 95.12 | 98.24 | 90.2 | 95.13 |
| 5 | 100 | 93.57 | 96.12 | 100 | 89 | 96.01 |

Table 3, below, illustrates the recognition rate (%) for 5 trials on the CK database with mere 7×7 image size:

|  | Proposed algorithm | | | SRC | | |
|---|---|---|---|---|---|---|
| $J_k$ | High | Low | Avg | High | Low | Avg |
| 5 | 96.2 | 94.01 | 95.47 | 89.3 | 93.4 | 91.41 |
| 6 | 97.43 | 94.63 | 95.93 | 94.04 | 91.3 | 93.77 |
| 7 | 97.35 | 95.21 | 96.15 | 91.89 | 94.9 | 93.29 |
| 8 | 97.9 | 95.23 | 96.49 | 94.43 | 81.0 | 89.78 |
| 9 | 98.01 | 95.28 | 96.90 | 97.73 | 95.4 | 96.29 |
| 10 | 98.63 | 95.69 | 97.14 | 98.1 | 94.1 | 95.64 |

Recognition in Low-Dimensional Feature Space:

To demonstrate the performance of the algorithm of embodiments described herein in critically low-dimensional feature space, linear random measurement was applied on 32×32 database images (1024 features), retaining only 40% to 10% values (feature space of 409 to 102 points) and the recognition results were evaluated. The original 32×32 images were then down-sampled to 16×16 (256 features) and the process was repeated for measurements from 60% to 10%. The effective feature dimensions vary from 153 to as low as just 25 points. Operating in such a low dimensional space is certainly challenging for any database, especially for a large database like CK. Table 4 tabulates the results; where the recognition rate is the average for 3 trials, with J=5, 4, and 11 for CMU, JAFFE and CK databases respectively. For this simulation, the TV minimization [12] was used. Clearly, even with 25 feature points, the recognition rate is as high as 94.35%, 97.69% and 97.818% for the three databases respectively.

Table 4, below, illustrates the recognition rate (%) for databases with low-dimensional features, wherein "% M" gives the percentage of measurement taken and "ED" refers to "effective dimension:"

| Image Size | % M | ED | CMU | JAFFE | CK |
|---|---|---|---|---|---|
| 32 × 32 = 1024 pixels | 10 | 102 | 99.23 | 97.69 | 98.425 |
|  | 20 | 204 | 99.45 | 98.46 | 98.69 |
|  | 30 | 307 | 99.67 | 98.69 | 98.91 |
|  | 40 | 409 | 99.78 | 98.69 | 99.01 |
| 16 × 16 = 256 pixels | 10 | 25 | 94.35 | 97.69 | 97.818 |
|  | 20 | 51 | 99.45 | 98.22 | 98.303 |
|  | 30 | 76 | 99.67 | 98.46 | 98.546 |
|  | 40 | 102 | 99.67 | 98.46 | 98.546 |
|  | 50 | 128 | 99.78 | 98.69 | 98.939 |
|  | 60 | 153 | 99.78 | 99.69 | 98.939 |

Robustness of Recognition with Respect to Expressions:

Two types of tests were further designed, one where similar expressions are present in both the training and the test sets, and the other where there is no common expression for the training and the test images. Three expressions (surprise, happiness and neutral) for each database were experimented with and the results (averaging over 3 trials) are shown in FIGS. 7A-7C. In all the cases, the performance is still very good: the worst case is only a loss of around 0.23%, 0.4% and 0.79% for CMU, JAFFE and CK databases, respectively, for the "surprise" expression. For the neutral expression, there is virtually no loss in accuracy (except for JAFFE where the loss is merely 0.05%).

Overall System and Electronic Device:

Referring to FIG. 8, an illustration of one type of system that would benefit from embodiments of the present invention is provided. As shown in FIG. 8, the system can include a face recognition (FR) server 100 in communication, either directly or via a communication network 400 (e.g., wired or wireless Local Area Network (LAN), wide area network (WAN), personal area network (PAN), etc.), with a database 200. The system may further include an image capture device 300 in communication, directly or via the same or different communication network 400, with the FR server 100 and the database 200.

According to one embodiment, the FR server 100, which is discussed in more detail below with regard to FIG. 9, may include any electronic device (e.g., personal computer (PC), laptop, mainframe computer system, etc.) configured to perform the FR techniques discussed above based on a plurality of images associated with a subject stored, at least temporarily, in the database 200. The database 200, which may be part of or operably connected to the FR server 100, may further store the two representations (i.e., the common and gross innovations components, respectively) discussed herein in association with each of a plurality of subjects. As noted above, once these representations have been generated and stored in the database, according to one embodiment, the plurality of images associated with the subject, which may have also been stored in the database 200, may be discarded, thus significantly reducing the amount of storage space required for implementing the FR techniques of embodiments of the present invention.

As one of ordinary skill in the art will recognize in light of this disclosure, the image capture device 300 may include any device capable of capturing any of the plurality of training images and/or the test image discussed herein. This may include, for example, a scanner, a digital computer, and/or the like.

Referring now to FIG. 9, a block diagram of an entity capable of operating as a FR server 100 is shown in accordance with one embodiment of the present invention. The entity capable of operating as a FR server 100 includes various means for performing one or more functions in accordance with embodiments of the present invention, including those more particularly shown and described herein. It should be understood, however, that one or more of the entities may include alternative means for performing one or more like functions, without departing from the spirit and scope of the present invention. As shown, the entity capable of operating as a FR server 100 can generally include means, such as a processor 110 for performing or controlling the various functions of the entity.

In particular, the processor 110 may be configured to perform the FR processes discussed in more detail above. For example, according to one embodiment the processor 110 may be configured to analyze a plurality of images associated with a subject (and, for example, stored, at least temporarily in the database 200) in order to generate a first and a second representation of the subject, wherein the first representation, referred to as the common component, captures one or more holistic features of the subject, and the second representation, referred to as the gross innovations component, captures one or more different expressions of the subject included in the plurality of images. The processor 110 may further be configured to generate a face classifier associated with the subject based at least in part on the first and second representations, such that a test image may be recognized as associated with the subject.

In one embodiment, the processor is in communication with or includes memory 120, such as volatile and/or non-volatile memory that stores content, data or the like. For example, the memory 120 may store content transmitted from, and/or received by, the entity. Also for example, the memory 120 may store software applications, instructions or the like for the processor to perform steps associated with operation of the entity in accordance with embodiments of the present invention. In particular, the memory 120 may store software applications, instructions or the like for the processor to perform the FR operations described above.

For example, according to one embodiment, the memory 120 may store one or more modules for instructing the processor 110 to perform the operations including, for example, a feature extraction module, and a face recognition module. In one embodiment, the feature extraction module may be configured to analyze a plurality of images associated with a subject in order to generate the first and second representations (i.e., the common and gross innovations components) of the subject discussed above. The face recognition module may thereafter be configured to generate a face classifier associated with the subject based at least in part on the first and second representations, such that a test image may be recognized as associated with the subject.

In addition to the memory 220, the processor 210 can also be connected to at least one interface or other means for displaying, transmitting and/or receiving data, content or the like. In this regard, the interface(s) can include at least one communication interface 230 or other means for transmitting and/or receiving data, content or the like, as well as at least one user interface that can include a display 240 and/or a user input interface 250. The user input interface, in turn, can comprise any of a number of devices allowing the entity to receive data from a user, such as a keypad, a touch display, a joystick or other input device.

Joint Sparsity Model with Matrix Completion:

In addition to the foregoing, according to one embodiment, a further face recognition technique may be provided, wherein, in addition to differing expressions, differing illumination and/or occlusions associated with the images of a subject may be taken into consideration. This may be especially useful, for example, where an unknown subject is attempting to mask his or her identity by using sunglasses, a scarf and/or the like.

In the JSM-based approach of one embodiment described above, the innovation component may be assumed to be sparse. However, this may not be the case for face images with illumination variations and/or large occlusions (e.g., from sunglasses or scarves), as these conditions may affect the whole (or a large part of) the face image and may not be easily sparsified in any basis.

Recently, the so-called "matrix completion theory" [19] has been proposed, by which a low-rank data matrix can be recovered from only a sparse sampling of its entries by minimizing the nuclear norm. Based on this theory, [20] proposed the Robust Principal Component Analysis (Robust PCA), in which a matrix X is decomposed into a low rank part A and a sparse part E. In [20], the method was used to remove shadows and specularities in face images, which were assumed to be captured by the sparse part, while the clean faces were assumed to be captured by the low rank part. However, this does not solve the issue of non-sparse conditions, such as illumination changes, and the assumption of a low-rank clean face image may not satisfied.

To overcome the above limitations, one embodiment of the present invention propose the Joint Sparsity Model with Matrix Completion (JSM-MC). As in the embodiment described above, according to this embodiment, given an ensemble of face images associated with a subject, an optimization algorithm can be used to efficiently decompose the images into a common component (i.e., information shared by the whole set) and a sparse part (e.g., expression or other unique features). However, in this embodiment, the images may further be decomposed into a low rank part (e.g., illumination or large occlusion(s)). This decomposition can be used together with the face classifier to produce accurate face recognition results in the presence of illumination and/or large occlusion. The following provides a more detailed explanation of this embodiment of the present invention.

Consider the case where $\mathbb{X}=\{X_1, X_2, \ldots X_N\}$ is a set of face images of the same person under different illumination/occlusion conditions. With the DSC model, $X_j=Z_c+Z_j$, where $Z_c$ represents the shared information of the face images while $Z_j$ is supposed to capture the image-specific properties, such as a specific illumination condition. Note that DCS benefits from the latter being sparse. However, illumination (or large occlusion(s)) can affect the entire face image, and, thus, may not be sparse. On the other hand, approaches based on matrix completion (e.g., Robust PCA) would assume that a low-rank matrix captures the common part of the face images, which is often too restrictive since a natural, clean face image may not be low-rank.

To address these issues, one embodiment of the present invention proposes the Joint Sparsity Model with Matrix Completion (JSM-MC) model. According to this embodiment, each image $X_j$ of the ensemble X may be represented by:

$$X_j = C + A_j + E_j \forall X_j \in \mathbb{X} \quad (19)$$

where C is the common part, $A_j$ is a low-rank matrix, and $E_j$ is a sparse innovation. This was partially motivated by the observation that in Eigenfaces [21], the first several singular values usually correspond to the illumination variation of the face image. Hence the low-rank matrix $A_j$ could capture the illumination information that a sparse matrix could not. With this model, the problem may be formulated as:

$$< C, \{A_j\}, \{E_j\} >= \underset{C,\{A_j\},\{E_j\}}{\operatorname{argmin}} \sum_j \|A_j\|_* + \lambda_j \|E_j\|_1, \quad (20)$$

$$\text{s.t.} \quad X_j = C + A_j + E_j \forall X_j \in \mathbb{X}$$

where $\lambda_j$ is a scalar.

If the augmented Lagrange multipliers are applied to Eqn. (2), one can get:

$$< C, \{A_j\}, \{E_j\} >= \underset{C,\{A_j\},\{E_j\}}{\operatorname{argmin}} L(C, \{A_j\}, \{E_j\}) \quad (21)$$

$$= \underset{C,\{A_j\},\{E_j\}}{\operatorname{argmin}} \sum_j \|A_j\|_* + \lambda_j \|E_j\|_1 +$$

$$< Y, X_j - C - A_j - E_j > +$$

$$\frac{\mu_j}{2} \|X_j - C - A_j - E_j\|_F$$

where $\mu_j$ is a scalar and $\|X\|_F$ the Frobenius norm.

It should be noted that, the objective function in Eqn. (2) of the proposed model looks similar in form to that of Robust PCA [2], where a matrix is decomposed into two parts, $X=A\pm E$, with A a low-rank matrix and E a sparse matrix. However, a difference of the embodiment described herein is the introduction of the common component, as in Eqn. (2). This enables the explicit modeling of the correlation among the images in the ensemble.

Directly solving Eqn. (3) may be difficult, as the variables have mutual dependency. According to one embodiment, the block coordinate descent method may be utilized for the optimization, i.e. optimizing a set of the parameters while fixing others. In particular, according to one embodiment, the parameters may be divided into three sets: C, $\{A_j\}$ and $\{E_j\}$ and then the optimization may be performed.

FIG. 10 supplies an example illustrating the outcome of the proposed method of the foregoing embodiment of the present invention. In particular, Column (a) shows six sample images of a subject from the AR Database. A total of 26 images for each subject were used in the experiments. The image size was 165*120. The images were converted to gray scale before processing. Columns (b) and (c) illustrate the innovations and the common component extracted by the JSM algorithm of one embodiment described herein. As shown, in this example, the common component was affected by factors like the sun glasses and the mask. Column (d) gives the results from the proposed JSM-MC method of another embodiment described herein, wherein the left column illustrates the low rank matrices and the right column illustrates the sparse matrices. It can be seen that factors such as illumination, sun glasses, and the mask are largely captured by the low rank matrices. Column (e) is the common component from the JSM-MC method of one embodiment, which, as shown, is less affected by the images with sun glasses or the mask.

Method of Identifying an Unknown Subject:

Reference is now made to FIG. 11, which summarizes the process described above for identifying an unknown subject in accordance with an embodiment of the present invention. As shown, the process may be divided into two phases, a training phase and an application (or testing) phase. In one embodiment, the training phase may begin upon receiving (e.g., by the FR server and, in particular, the processor executing on the FR server) a plurality of images (e.g., 20, 50, 100, etc.) associated with each of a plurality of subjects (e.g., 100, 1000, 10,000, etc.), wherein each image may depict a different expression of the subject, different illumination conditions and/or one or more different occlusions. (Block 1101).

Upon receiving the ensemble of images associated with a given subject, the FR server (e.g., the processor executing thereon) may, at Block 1102, decompose each image depicting that subject into a common component image and an innovation component image. As described above, the common component image may represent all of the features that are common to all of the images depicting the subject, whereas the innovation component image may represent the features of the individual image that are unique or particular to that image—e.g., the subject's expressions. While not shown, according to another embodiment described above, the FR server (e.g., the processor executing thereon) may further decompose the image into a low-rank data matrix representing the illumination and/or occlusion(s) associated with the image.

Once each image has been decomposed, the FR server (e.g., the processor executing thereon) may combine the innovation component images of each image associated with a given subject into a single gross innovation component image (Block 1103) and then store the common component image and the gross innovation component image in a database in association with the subject (Block 1104). In one embodiment, as described above, in order to further reduce the amount of data stored, only random measurements of the common component image and the gross innovation component image may be stored. The foregoing steps may be performed for each subject for which an ensemble of images has been received, so that the database may store a common component image and a gross innovation component image associated with each of a plurality (e.g., 100, 1000, 10,000, etc.) of subjects that can be used to identify an unknown subject in a received image.

Accordingly, in order to begin the application phase, the FR server (e.g., a processor executing thereon) may receive an input image of an unknown subject. (Block 1105). In order to identify the unknown subject, in one embodiment, the FR server (e.g., a processor executing thereon) may perform two functions—sparse representation and classification. In particular, the FR server may begin by first assuming that the unknown subject is one of the known subjects stored in the database. Based on this assumption, the FR server (e.g., processor executing thereon) may extract the innovation component image of the received input image based on the stored gross innovation component image associated with the known subject. (Block 1106). The FR server (e.g., processor executing thereon) may then, at Block 1107, combine the extracted innovation component image with the stored common component image associated with the known subject in order to create or generate an estimate or approximation of the received input image. In one embodiment, not shown, where a low-rank data matrix is also stored in association with the known subject, this may further be combined with the extracted innovation component image, in addition to the stored common component image.

Once the two (or three) images/components have been combined, the FR server (e.g., processor executing thereon) may, at Block 1108, calculate a representation error associated with the known subject by comparing the estimate or approximate of the received input image (i.e., the combination of the extracted innovation component image and the stored common component image (and optionally the low-rank data matrix)) with the received input image itself. Once the foregoing steps have been performed for each of the known subjects in the database, resulting in a representation error associated with each known subject, the FR server (e.g., the processor executing thereon) may identify the unknown subject based on the calculated representation errors. (Block 1109).

In particular, if the unknown subject is the known subject for which the common component image (and optionally low-rank data matrix) was used, then the estimate of the received input image would be substantially the same as the received input image and, in turn, the representation error associated with that known subject would be small. As a result, in one embodiment, in order to identify the unknown subject, the FR server (e.g., processor executing thereon) may select the known subject in association with which the representation error is the smallest.

Conclusion:

As described above, embodiments of the present invention propose a novel technique based on compressive sensing for expression-invariant face recognition. The approach of one embodiment exploits the correlation of images from the same subject through joint sparsity models in designing novel algorithms for feature extraction and face recognition. Thorough analysis of the proposed algorithms and their performance evaluation, with comparison to the state-of-the-art, were performed to demonstrate the claimed advantages.

To summarize, the foregoing provides novel techniques for (i) super-compact, space-efficient storage and highly compressed representations of an ensemble of face images; (ii) intelligent feature extraction from frontal face images with varying expressions, that enables the compact packing of information pertaining to face expressions (from all images) into only a single image with negligible loss; and (iii) face recognition and classification (under varying expressions) using ultra-low dimensional versions of the face images.

As described above, embodiments of the present invention further include a critically down-sampled face image, or its ultra-low dimensional random projection, which can, for example, be as low as 25 data points, for a fairly large face database (with thousands of images and hundreds of subjects). As noted above, many existing techniques need far higher dimensions (e.g., hundreds of data points or more) to achieve comparable classification results.

According to embodiments described herein, the training face images of a single subject can be considered as an ensemble of inter-correlated signals, and a technique has been developed to represent each subject with two feature images: (i) one that captures holistic or gross face features (the common component) and (ii) one that captures mostly the unique features (e.g., expressions) of all images in a single image (the gross innovation component). In one embodiment, this technique is based on Compressive Sensing (CR) theory and Joint Sparsity Model (JSM).

To achieve this, according to one embodiment, a transformation basis that can sparsely represent the image with few coefficients can be first identified. As described above, common choices are Discrete Cosine Transforms (DCT) or Wavelet transforms. A joint decomposition of the ensemble of transform coefficients of N images into N+1 can then be sought with a constraint that one component is common to the ensemble (the common component) and the rest are the respective residuals (innovations), which closely resemble facial expressions. While an infinite number of decompositions may exist, embodiments of the present invention focus on the sparsest joint decomposition, which is unique and can be achieved through an additional constraint of sparsity imposed as a minimization of l-1 norm of the joint representation. This can be achieved by casting the above as a l-1 minimization problem under JSM framework and solving it by l-1 optimization techniques.

The next step of embodiments described herein, can be to sum the expressions or innovations to form the gross innovation. According to embodiments of the present invention, only the common and gross innovations can be stored, and the other results and original ensemble images can be discarded, thus achieving space efficient storage.

According to embodiments of the present invention, as described above, for the purpose of face recognition, the common and gross innovation component images can act as "Feature images" for each labeled class subject. In particular, as further described above, a problem of recognition of an unknown object can be to correctly identify the class to which it "belongs," using some information derived from labeled training samples belonging to K distinct classes. Using only the two representations generated in accordance with embodiments of the present invention, according to one embodiment, a test image can be classified to one of the K subject classes. According to this embodiment, this can involve a two-fold procedure: (1) an estimation of expression information of the test image using the gross innovation feature; and (2) completing the test image as the sum of common and previously estimated expression information. This can be performed for all K subject classes, wherein the estimate that is the closest to the actual test image is the correct class. As described herein, a main step is estimating the expression information, which can be achieved by finding the common component between the transform coefficients of a difference image and that of the gross innovation, wherein the different image is the difference between the actual test image and the common training feature.

In addition to the foregoing, as also described above, embodiments of the present invention can further provide for ultra-low dimensional classification. In particular, as discussed above, a major problem in any face recognition system is handling the "Curse of High-Dimensionality." It can be cumbersome to operate with high dimensional data since (i) it is computationally expensive; and (ii) it can lead to implementation and practical issues, especially in a large scale system like face recognition.

In the face recognition system of embodiments described herein, one can operate not just on a reduced dimension of data, but on a heavily reduced or "ultra-low" dimensional version of the data. This technique is based on harnessing the powers of CS theory as follows. In the face classifier embodiments described above, the first step is estimating the transform coefficients of expression information, which can be very sparse due to the nature of training or feature extraction procedure described above. Such a sparse vector can be recovered using CS recovery techniques through a far lower dimensional random projection of the test image instead of the actual test image. In other words, the complete operation in the above-referenced step can be successfully performed with highly low dimensional "random measurements" of all the data involved.

As one or ordinary skill will recognize in light of this disclosure, embodiments of the present invention can be extended to handle variations in lighting or illumination of faces, and/or variations in poses (in addition to the variations of expression described above), while still retaining at least the above-referenced advantages.

As described above and as will be appreciated by one skilled in the art, embodiments of the present invention may be configured as a system, method or electronic device. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as processor 110 discussed above with reference to FIG. 9, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus (e.g., processor 110 of FIG. 9) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

REFERENCES

The following references are herein incorporated by reference in their entirety.

[1] P. Belhumeur, J. Hespanha, D. Kriegman, "Eigenfaces vs. Fisherfaces: recognition using class specific linear projection", in: European Conference on Computer Vision, 1996, pp. 45-58.

[2] W. Zhao, R. Chellppa, P. J. Phillips, A. Rosenfeld "Face Recognition: A Literature Survey" ACM Computing Surveys, Vol. 35, No. 4, December 2003, pp. 399-458.

[3] J. Wright, A. Yang, A. Ganesh, S. Sastry, and Y. Ma. "Robust face recognition via sparse representation". *IEEE Trans. PAMI* [DOI 10.1109/TPAM1.2008.79].

[4] J. Huang, X. Huang, D. Metaxas, "Simultaneous Image Transformation and Sparse Representation Recovery" IEEE Conf. on CVPR, Anchorage, Ak., June 2008.

[5] D. Baron, M. Duarte, S. Sarvotham, M. B. Wakin, and R. G. Baraniuk, "Distributed compressed sensing," Tech. Rep. TREE0612, Rice University, Online at: http://dsp.rice.edu/cs/.

[6] E J. Candès and M B. Wakin "An Introduction to Compressive Sampling", *IEEE Signal Proc. Magazine*, Vol. 25, Issue 2, March 2008, pp. 21-31.

[7] X. Liu, T. Chen and B. V. K. Vijaya Kumar, "Face Authentication for Multiple Subjects Using Eigenflow" Pattern Recognition, Volume 36, Issue 2, February 2003, pp. 313-328.

[8] M. J. Lyons, S. Akamatsu, M. Kamachi, J. Gyoba "Coding Facial Expressions with Gabor Wavelets" *IEEE Int Conf. on Auto. Face and Gesture Recognition*, Nara, Japan, April, 1998.

[9] Kanade, T., Cohn, J. F., & Tian, Y. "Comprehensive database for facial expression analysis" *IEEE Int. Conf on Automatic Face and Gesture Recognition*, Grenoble, France, 2000.

[10] M. F. Duarte, S. Sarvotham, D. Baron, M. B. Wakin and R. G. Baraniuk, "Distributed Compressed Sensing of Jointly Sparse Signals", *39th Asilomar Conference on Signals, Systems and Computer (IEEE Cat. No.*05CH37761), 2005, pp. 1537-41.

[11] M. Figueiredo, R. Nowak, and S. Wright. "Gradient projection for sparse reconstruction: application to compressed sensing and other inverse problems". *IEEE Journal on Selected Topics in Signal Processing*, 2007, Vol 1, Issue 4, pp. 586-597.

[12] E. Candès and J. Romberg, "Practical signal recovery from random projections". Wavelet Applications in Signal and Image Processing XI, Proc. SPIE Conf. 5914.

[13] E. Candès, J. Romberg, and T. Tao. "Robust uncertainty principles: Exact signal reconstruction from highly incomplete frequency information". *IEEE Trans. Inf. Theory*, 52:489-509, 2006.

[14] E. Candès and T. Tao. "Near-optimal signal recovery from random projections: Universal encoding strategies?" *IEEE Trans. on Information Theory*, 52 (12):5406-5425, 2006.

[15] D. L. Donoho, "Compressed sensing," *IEEE Trans. Inform. Theory*, vol. 52, July 2006, pp. 1289-1306.

[16] E. Cand'es, J. Romberg, and T. Tao, "Stable signal recovery from incomplete and inaccurate measurements," Comm. on Pure and Applied Math, vol. 59, no. 8, 2006, pp. 1207-1223.

[17] S. Kim, K. Koh, M. Lustig, S. Boyd, and D. Gorinvesky. "A method for large-scale l1-regularized least squares problems with applications in signal processing and statistics," *IEEE J. Selected Topics in Signal Processing*, 1 (4): 606-617, December 2007.

[18] E. Cand'es and J. Romberg, "$l^1$-magic: Recovery of Sparse Signals via Convex Programming" User Guide, l1-magic software, Available at http://www.acm.caltech.edu/l1magic/.

[19] E. J. Candes and B. Recht, "Exact matrix completion via convex optimization," *Foundations of Computational Mathematics*, Vol. 9, pp. 717-772.

[20] J. Wright, A. Ganesh, S. Rao, and Y. Ma, "Robust principal component analysis: Exact recovery of corrupted low-rank matrices via convex optimization," submitted to *Journal of the ACM*, 2009.

[21] M. Turk and A. Pentland, "Eigenfaces for recognition," *Journal of cognitive neuroscience*, vol. 3, pp. 71-86, 1991.

That which is claimed:

1. A method comprising:
receiving a plurality of images depicting a subject for each of a plurality of known subjects;
deriving, by a processor, a common component image associated with the subject for each known subject based on the received plurality of images depicting the subject, said common component image capturing one or more features common to all images in the plurality of images;
deriving, by the processor, a gross innovation component image associated with the subject for each known subject based on the received plurality of images depicting the subject, said gross innovation component image capturing a combination of one or more features unique to respective images of the plurality of images;
deriving, by the processor, a low-rank data matrix associated with each known subject, said low-rank data matrix capturing an illumination component of each image of the plurality of images;
storing, in a database, the common component image, the gross innovation component image, and the low-rank data matrix associated with each known subject;
receiving a new input image depicting an unknown subject; and
identifying the unknown subject based at least in part on the stored common component image and the gross innovation component image associated with each of the plurality of known subjects, wherein identifying the unknown subject further comprises, for each of the plurality of known subjects:
extracting an innovation component image associated with the new input image based on the gross innovation component image associated with the known subject,
combining the extracted innovation component image with the stored common component image associated with the known subject to create an approximation of the received new input image,
determining a representation error associated with the known subject, said representation error representing the difference between the received new input image and the approximation of the received new input image, and
identifying the unknown subject as the known subject having the lowest representation error associated therewith.

2. The method of claim 1, wherein deriving the common component image and deriving the gross innovation component image further comprise:
decomposing respective images of the plurality of images into the common component image and an innovation component image; and
combining the innovation component image of respective images of the plurality of images into the gross innovation component image.

3. The method of claim 1, wherein the common component image and the gross innovation component image each comprise a plurality of measurements, and wherein storing the common component image and the gross innovation component image further comprises storing a subset of the measurements of the common component image and a subset of the measurements of the gross innovation component image, respective subsets comprising fewer than all of the plurality of measurements.

4. The method of claim 1, wherein the common component image and the gross innovation component image are of substantially the same size.

5. The method of claim 1, wherein identifying the unknown subject further comprises:
for each of the plurality of known subjects:
extracting an innovation component image associated with the new input image based on the gross innovation component image associated with the known subject;
combining the extracted innovation component image with the stored common component image and the low-rank data matrix associated with the known subject to create an approximation of the received new input image;
determining a representation error associated with the known subject, said representation error representing the difference between the received new input image and the approximation of the received new input image; and
identifying the unknown subject as the known subject having the lowest representation error associated therewith.

6. An apparatus comprising:
a processor configured to:
receive a plurality of images depicting a subject for each of a plurality of known subjects;
derive a common component image associated with the subject for each of the plurality of known subjects based on the received plurality of images depicting the subject, said common component image capturing one or more features common to all images in the plurality of images;
derive a gross innovation component image associated with the subject for each of the plurality of known subjects based on the received plurality of images depicting the subject, said gross innovation component image capturing a combination of one or more features unique to respective images of the plurality of images;
derive a low-rank data matrix associated with each known subject, said low-rank data matrix capturing an illumination component of each image of the plurality of images;
store, in a database, the common component image, the gross innovation component image, and a low-rank data matrix associated with each known subject;
receive a new input image depicting an unknown subject; and
identify the unknown subject based at least in part on the stored common component image and the gross innovation component image associated with each of the plurality of known subjects, wherein in order to identify the unknown subject, the processor is further configured to, for each of the plurality of known subjects:
extract an innovation component image associated with the new input image based on the gross innovation component image associated with the known subject,
combine the extracted innovation component image with the stored common component image associated with the known subject to create an approximation of the received new input image,
determine a representation error associated with the known subject, said representation error representing the difference between the received new input image and the approximation of the received new input image, and
identify the unknown subject as the known subject having the lowest representation error associated therewith.

7. The apparatus of claim 6, wherein in order to derive the common component image and to derive the gross innovation component image, the processor is further configured to:
decompose respective images of the plurality of images into the common component image and an innovation component image; and
combine the innovation component image of respective images of the plurality of images into the gross innovation component image.

8. The apparatus of claim 6, wherein the common component image and the gross innovation component image each comprise a plurality of measurements, and wherein in order to store the common component image and the gross innovation component image, the processor is further configured to store a subset of the measurements of the common component image and a subset of the measurements of the gross innovation component image, respective subsets comprising fewer than all of the plurality of measurements.

9. The apparatus of claim 6, wherein the common component image and the gross innovation component image are of substantially the same size.

10. The apparatus of claim 6, wherein in order to identify the unknown subject, the processor is further configured to:
for each of the plurality of known subjects:
extract an innovation component image associated with the new input image based on the gross innovation component image associated with the known subject;
combine the extracted innovation component image with the stored common component image and the low-rank data matrix associated with the known subject to create an approximation of the received new input image;
determine a representation error associated with the known subject, said
representation error representing the difference between the received new input image and the approximation of the received new input image; and
identify the unknown subject as the known subject having the lowest representation error associated therewith.

11. A computer program product comprising at least one non-transitory computer-readable storage medium having computer-readable program code portions stored therein, said computer-readable program code portions comprising:
a first executable portion for receiving a plurality of images depicting a subject for each of a plurality of known subjects based on the received plurality of images depicting the subject;
a second executable portion for deriving a common component image associated with the subject for each of a plurality of known subjects based on the received plurality of images depicting the subject, said common component image capturing one or more features common to all images in the plurality of images;
a third executable portion for deriving a gross innovation component image associated with the subject, said gross innovation component image capturing a combination of one or more features unique to respective images of the plurality of images;

a fourth executable portion for deriving a low-rank data matrix associated with each known subject, said low-rank data matrix capturing an illumination component of each image in the plurality of images;

a sixth executable portion for storing, in a database, the common component image, the gross innovation component image, and the low-rank data matrix associated with each known subject;

a seventh executable portion for receiving a new input image depicting an unknown subject; and an eighth executable portion for identifying the unknown subject based at least in part on the stored common component image and the gross innovation component image associated with each of the plurality of known subjects, wherein the eighth executable portion is further configured to, for each of the plurality of known subjects:

extract an innovation component image associated with the new input image based on the gross innovation component image associated with the known subject, combine the extracted innovation component image with the stored common component image associated with the known subject to create an approximation of the received new input image, determine a representation error associated with the known subject, said representation error representing the difference between the received new input image and the approximation of the received new input image, and identify the unknown subject as the known subject having the lowest representation error associated therewith.

12. The computer program product of claim 11, wherein the second and third executable portions are further configured to:

decompose respective images of the plurality of images into the common component image and an innovation component image; and combine the innovation component image of each image in the plurality of images into the gross innovation component image.

13. The computer program product of claim 11, wherein the common component image and the gross innovation component image each comprise a plurality of measurements, and wherein the sixth executable portion is further configured to store a subset of the measurements of the common component image and a subset of the measurements of the gross innovation component image, respective subsets comprising fewer than all of the plurality of measurements.

14. The computer program product of claim 11, wherein the common component image and the gross innovation component image are of substantially the same size.

15. The computer program product of claim 11, wherein the eighth executable portion is further configured to:

for each of the plurality of known subjects:

extract an innovation component image associated with the new input image based on the gross innovation component image associated with the known subject;

combine the extracted innovation component image with the stored common component image and the low-rank data matrix associated with the known subject to create an approximation of the received new input image;

determine a representation error associated with the known subject, said representation error representing the difference between the received new input image and the approximation of the received new input image; and identify the unknown subject as the known subject having the lowest representation error associated therewith.

\* \* \* \* \*